US011709019B2

(12) United States Patent
Pancher et al.

(10) Patent No.: US 11,709,019 B2
(45) Date of Patent: Jul. 25, 2023

(54) SEALING SYSTEM FOR A MACHINE FOR THERMAL TREATMENT OF BULK MATERIAL

(71) Applicant: Metso Minerals Industries, Inc., Waukesha, WI (US)

(72) Inventors: Jeffrey M. Pancher, Coal Township, PA (US); Neil R. Dock, Selinsgrove, PA (US); Brian Morgan, Watsontown, PA (US); David Koerber, Lancaster, PA (US); Andrew Wisner, Gainesville, GA (US)

(73) Assignee: Metso Minerals Industries, Inc., Brookfield, WI (US)

( * ) Notice: Subject to any disclaimer, the term of this patent is extended or adjusted under 35 U.S.C. 154(b) by 459 days.

(21) Appl. No.: 16/885,511

(22) Filed: May 28, 2020

(65) Prior Publication Data

US 2021/0372702 A1    Dec. 2, 2021

(51) Int. Cl.
*F27D 3/12* (2006.01)
*B65G 17/16* (2006.01)
(Continued)

(52) U.S. Cl.
CPC ............. *F27D 3/123* (2013.01); *B65G 17/16* (2013.01); *F27D 3/00* (2013.01);
(Continued)

(58) Field of Classification Search
CPC . B65G 17/16; B65G 2201/0267; F27B 21/06; F27B 9/24; F27B 9/26;
(Continued)

(56) References Cited

U.S. PATENT DOCUMENTS

| 1,183,394 A | 5/1916 | Merrick |
| 2,207,412 A | 7/1940 | Prouty |

(Continued)

FOREIGN PATENT DOCUMENTS

| CN | 106524770 | * | 3/2017 | ......... F27D 99/0076 |
| DE | 3121709 A1 | | 4/1982 | |
| EP | 1193459 A1 | | 4/2002 | |

OTHER PUBLICATIONS

International Search Report and Written Opinion for corresponding International Application No. PCT/US2021/034503 dated Sep. 21, 2021.

*Primary Examiner* — Jessee R Roe
*Assistant Examiner* — Michael Aboagye
(74) *Attorney, Agent, or Firm* — Andrus Intellectual Property Law, LLP

(57) ABSTRACT

The disclosure relates to a machine for thermal treatment of bulk material, comprising, a stationary furnace which presents a support structure, and a plurality of pallet cars traveling through the furnace, said plurality of pallet cars together defining, at a lateral side thereof, a common engagement surface which extends through the furnace, wherein a gap is defined between the support structure of the furnace and the common engagement surface, said gap having a gap length, the machine further comprising: a sealing system comprising: one or more drop bars, wherein each drop bar of the one or more drop bars includes a brush arranged on the drop bar such that the brush is configured to be in engagement with the common engagement surface such that the one or more drop bars covers the gap over at least parts of the gap length.

21 Claims, 11 Drawing Sheets

(51) Int. Cl.
   *F27D 3/00* (2006.01)
   *F27D 19/00* (2006.01)
(52) U.S. Cl.
   CPC ............... *B65G 2201/0267* (2013.01); *F27D 2003/0034* (2013.01); *F27D 2003/0059* (2013.01); *F27D 2019/0081* (2013.01)
(58) Field of Classification Search
   CPC ..... F27D 2003/0034; F27D 2003/0059; F27D 2019/0081; F27D 3/00; F27D 3/123; F27D 99/0076
   USPC ........ 414/147; 266/176, 177, 178, 179, 279, 266/180; 75/756, 755
   See application file for complete search history.

(56) References Cited

U.S. PATENT DOCUMENTS

| | | | | |
|---|---|---|---|---|
| 2,293,904 A | | 8/1942 | Kail | |
| 2,848,214 A | * | 8/1958 | Schofield | F27B 21/06 |
| | | | | 266/179 |
| 2,861,792 A | * | 11/1958 | Porteus et al. | C22B 1/20 |
| | | | | 266/179 |
| 3,724,828 A | * | 4/1973 | Bradwell | F27B 21/06 |
| | | | | 266/179 |
| 3,744,777 A | * | 7/1973 | Marsh | F26B 15/143 |
| | | | | 34/236 |
| 2015/0233641 A1 | | 8/2015 | Schulakow-Klass et al. | |

* cited by examiner

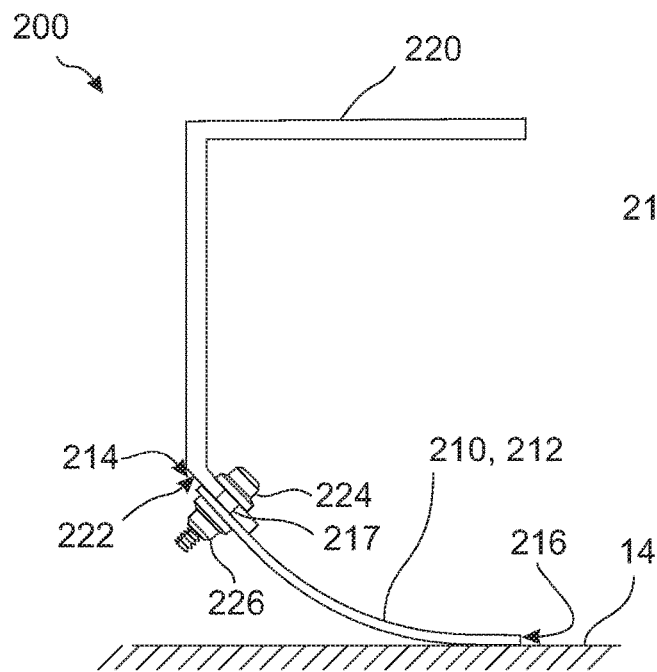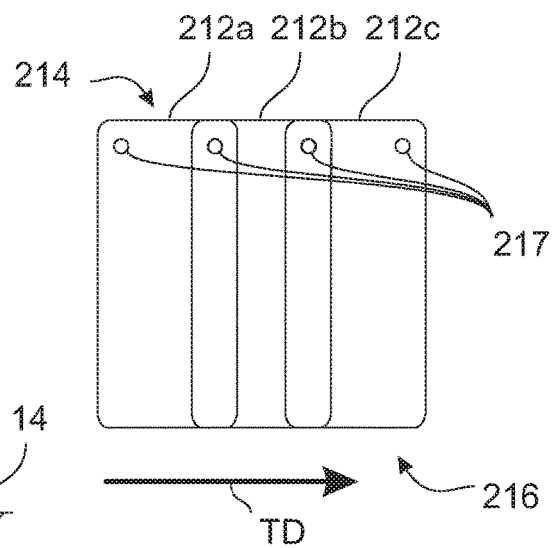
Fig. 5A    Fig. 5B
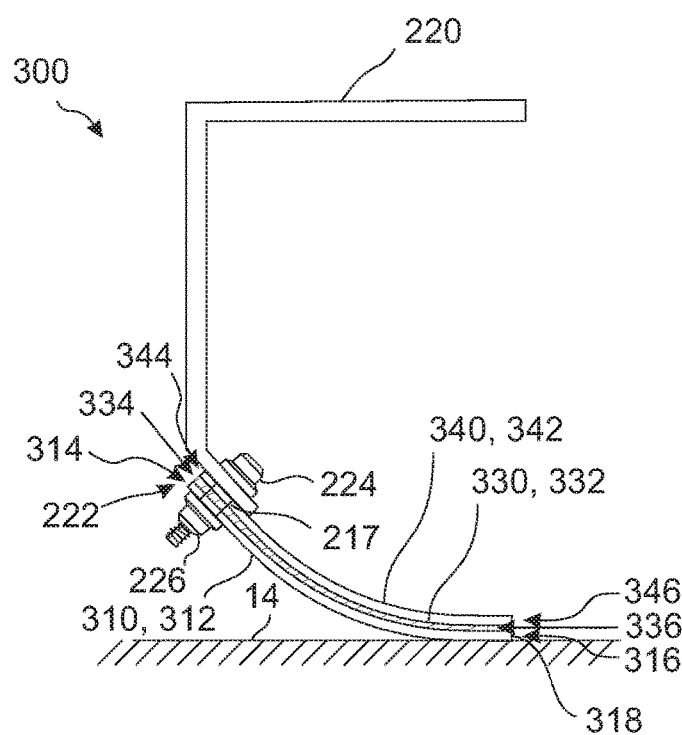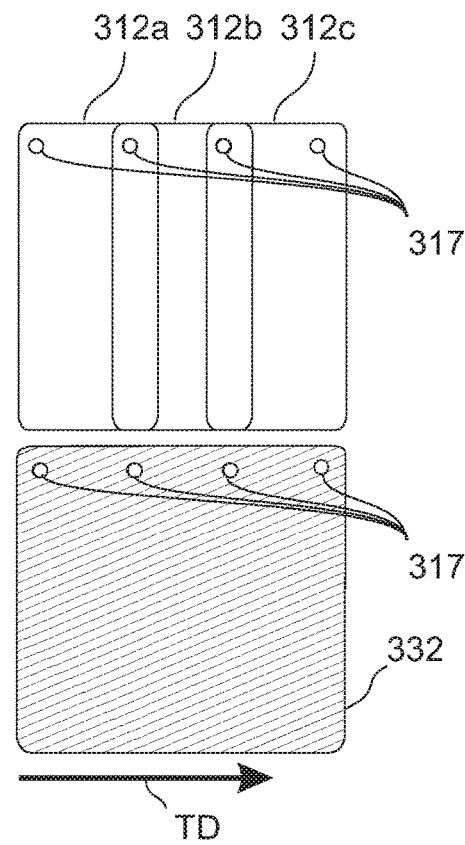
Fig. 6A    Fig. 6B

SEALING SYSTEM FOR A MACHINE FOR THERMAL TREATMENT OF BULK MATERIAL

FIELD OF THE INVENTION

The present invention relates to a machine for thermal treatment of bulk material. More specifically, the disclosure further relates to a sealing system for the machine for thermal treatment of bulk material.

BACKGROUND ART

Machines for thermal treatment of bulk material, such as a sintering or a pelletizing system, are known in the art. These machines are configured to transform the bulk material, or pelletized concentrate, into hardened pellets that e.g. can be used as blast furnace feed or direct reduction furnace feed. The machines comprise a furnace and a plurality of pallet cars, wherein the pallet cars are arranged for transporting the bulk material into the furnace. The machines comprise different heating and cooling zones and the pallet cars are arranged for transporting the bulk material through the different zones of the machine such that hardened pellets are produced.

A problem with the machines is that a gap is defined between the pallet cars and the furnace when the pallet cars are traveling through the furnace. A drawback with this gap is that dust and other particulate matter as well as hazardous gases can escape the furnace and tramp air can enter the hot gases within the furnace.

In an attempt to meet this problem, US Patent Application US2293904A suggests maintaining a sealing system with a drop bar seal design being arranged between a traveling grate and a gas collecting hood. The drop bar seal design defines continuous troughs along the sides of the traveling grate for carrying dust out of the hood. US Patent Application US20150233641 A1 suggests maintaining a sealing system with a spring-loaded sealing strip contacting a planar sealing surface being arranged along the furnace. However, with the solutions disclosed by US1183394 A and US20150233641 A1 there is a need in the art for improvements in terms of increased sealing efficiency and increased durability.

SUMMARY

It is an object to mitigate, alleviate or eliminate one or more of the above-identified deficiencies in the art and disadvantages singly or in any combination and solve at least the above-mentioned problem.

According to a first aspect there is provided a machine for thermal treatment of bulk material, comprising:

a stationary furnace which presents a support structure, and a plurality of pallet cars traveling through the furnace along a traveling direction, said plurality of pallet cars together defining, at a lateral side thereof, a common engagement surface which extends through the furnace along the traveling direction, wherein a gap is defined between the support structure of the furnace and the common engagement surface of the plurality of pallet cars, said gap having a gap length along the traveling direction, the machine further comprising:

a sealing system comprising:

one or more drop bars distributed after each other along the traveling direction;

wherein each drop bar of the one or more drop bars includes a brush arranged on the drop bar such that the brush is configured to be in engagement with the common engagement surface such that the one or more drop bars covers the gap over at least parts of the gap length.

By the term "bulk material" is here meant any metal ore. Given as a non-limiting example, bulk material may be iron ore, copper ore, zinc ore, phosphate ore or any other metallic or non-metallic mineral ore normally treated within the mining industry.

By the phrase "machine for thermal treatment" is here meant any machine performing any type of treatment involving elevating the temperature of the bulk material. Such thermal treatment may be but is not limited to pelletizing or sintering. By way of example, the bulk material may be filled into the pallet cars which subsequently travel along a track through a furnace. The furnace may comprise one or more treatment zones. Each treatment zone is adapted for a specific thermal treatment process of the bulk material. Given as non-limiting examples, thermal treatment in the different zones may involve heating, firing, drying or cooling the bulk material. The machine may comprise one or more wind boxes arranged in the zones of the furnace, below the track of the pallet cars and by suction generate a flow of the hot air or gas above the pallet cars through the bulk material. The machine may be a straight grate furnace.

By the term "support structure" is here meant a steady and stationary part of the furnace that may allow mounting or attachment of other parts thereto. Given only as examples, a support structure may be a part of a wall of the furnace or a metal framework. Herein, the support structure serves to support one or more parts of the sealing system.

By the term "drop bar" is here meant a stationary rigid part of the sealing system. The drop bar may be of a rectangular shape, wherein the length of the drop bar is substantially longer than the width and the height of the drop bar. Herein, the length of the drop bar is the dimension of the drop bar in the traveling direction of the pallet cars. Given only as example, the drop bar may be a metal framework of the sealing system. The one or more drop bars may be distributed after each other along the traveling direction so as to form a sealing surface. Each drop bar of the one or more drop bars may have an elongate extension. Each drop bar of the one or more drop bars may be aligned such that the elongate extension is parallel with the traveling direction. Each drop bar of the one or more drop bars may be slidably connected to the support structure of the furnace. Preferably, each drop bar is slidably connected to the support structure such that the drop bar is displaceable in a vertical, or substantially vertical, direction. This implies that each drop bar may be displaceable in a direction transverse to the common engagement surface. For some embodiments, the drop bars may be forced, by gravity, to be in engagement with the common engagement surface.

By the term "brush" is here meant a part of the drop bar comprising a plurality of bristles. The bristles are arranged such as a brush seal is provided. The length of the bristles may be substantially longer than the thickness of the bristles. Herein, the length of the bristles is the dimension perpendicular to the traveling direction of the pallet cars.

The sealing system may be advantageous as it seals the gap between the support structure of the furnace and the common engagement surface of pallet cars, wherein the gap occurs when the pallet cars are traveling along the traveling direction through the furnace. The sealing system may cover the gap over at least parts of the gap length such as it prevents dust from escaping and tramp air from entering the hot gases. The sealing system according to the present disclosure is particularly advantageous in that it combines any conventional drop bar seal design with the brush such as a more efficient and a more durable seal will be provided compared to conventional arrangements.

A further advantage of the sealing system of the disclosure is that a more efficient and flexible sealing system is achieved compared to conventional arrangements. By this arrangement, the sealing system is efficiently adjusted to uneven surfaces by reason of the slidable connection and the flexibility of the brush. By way of example, uneven surfaces may be the result of uneven height positioning of the pallet cars or of the common engagement surfaces thereof, or it may be a result of material getting stuck between the common engagement surface and the brush. In case of an uneven surface causing an individual part of the brush to lose contact with the common engagement surface of the pallet car, it does not affect adjacent parts of the brush. Consequently, adjacent parts of the brush may continue to be in contact with the common engagement surface, maintaining the seal to a higher degree than compared to conventional seal systems based on drop bars or long flexible seals, which would create large leaks through the seal in similar situations since such conventional seal systems cannot adjust the seal efficiently enough to uneven surfaces.

Yet a further advantage, since the sealing system will be exposed to high temperatures within some zones of the furnace, may be that cooling air can get through the brush and thereby cool the brush in an easy way. Further, including the brush in the sealing system will provide for a sealing system which is good to endure heat, and hence, a more durable seal is achieved.

In the manner described above fuel and power efficiency of the machine is increased. By the present arrangement, energy savings of up to 10% may be provided, compared to a machine for thermal treatment of bulk material without such a sealing system with brushes.

Yet a further advantage of the disclosed sealing system is that it is possible to replace one brush within the sealing system without the need of replacing the whole sealing system. By this arrangement, it may be easy to perform maintenance operations to the sealing system, and especially to the brush.

Yet a further advantage with the disclosed design is that the brush is equally well capable of moving over the common engagement surface independent on the traveling direction of the pallet cars. Thus, even if there typically is one specific travelling direction used during operation of the machine, the need to operate the machine in reverse, e.g. during maintenance, will be equally possible.

The brush may comprise a plurality of brush bristles which are each attached to a brush element. The brush element may be an elongated structure having a substantially rectangular cross section but may alternatively have a rounded cross section.

According to some embodiments, brush bristles of the brush are made of stainless steel. For alternative embodiments, the brush bristles of the brush are made of regular steel, or synthetic polymers such as Nylon.

Preferably, the bristles are made of stainless steel. This material is durable and withstands high temperature well. Also, the material is flexible enough for the sealing system to efficiently adjust to uneven surfaces.

According to some embodiments, brush bristles of the brush has a length of at least 20 mm, preferably between 20 and 100 mm, and more preferably 50 mm.

According to some embodiments, each drop bar further comprises a drop bar structure slidably connected to the support structure of the furnace, wherein the brush is carried by the drop bar structure. This implies that the drop bar structure may correspond to a conventional drop bar. The drop bar structure may, however, be structurally different than a conventional drop bar. This is further elaborated on herein.

By the term "slidably connected" is here meant a connection wherein the drop bar structure being connected to the support structure in a way that the drop bar structure can be moved smoothly along a surface in relation to the support structure. Herein, the drop bar structure allows to move in a vertical direction, wherein the vertical direction is perpendicular to the common engagement surface. The connection defines how much the drop bar structure is allowed to move in the vertical direction in relation to the drop bar structure. This slidable connection allows for the brush to be moved in the vertical direction as well.

By the term "carried by the drop bar structure" is here meant that the brush is attached to, or clamped by, the drop bar structure, wherein the drop bar structure is arranged to keep the brush in place.

According to some embodiments, the brush protrudes out from the drop bar structure such that a clearance is formed between the drop bar structure and the common engagement surface.

According to some embodiments, the clearance between the drop bar structure and the common engagement surface is at least 1 mm, preferably 5 to 20 mm, and more preferably 10 mm.

An advantage with these embodiments may be that the sealing system is further efficient. By this arrangement, the common engagement surface may have an uneven surface without the drop bar structure being in engagement with the common engagement surface. This arrangement will provide for less wear one wear parts and thus, an increased life time of the sealing system.

According to some embodiments, the drop bar structure of each drop bar of the one or more drop bars comprises a recess configured to receive the brush therein.

According to some embodiments, each drop bar of the one or more drop bars further comprises a fastening plate configured to connect the brush to the drop bar structure. The brush may be connected to the drop bar structure by clamping. The brush may be directly clamped between the fastening plate and the drop bar structure. Alternatively, the brush may be held by a further element which, in turn, is clamped, between the fastening plate and the drop bar structure, as will be detailed later.

By the term "clamped" is here meant that the brush is attached or fastened between the drop bar structure and the fastening plate in order to be kept in place. The brush may be clamped towards the drop bar structure using bolts or screws.

An advantage with these embodiments may be that it is possible to attach or detach the brush from the drop bar structure in an easy and user-friendly way.

According to some embodiments, each drop bar of the one or more drop bars further comprises a brush holder configured to hold the brush and wherein the fastening plate is configured to clamp the brush holder towards the drop bar structure.

An advantage with these embodiments may be that it is easier to attach or detach the brush from the drop bar structure than if the brush is mounted directly to the drop bar without the use of a brush holder. The brush holder may be tailored so as to perfectly fit a specific kind of brush. This allows for mounting different kinds of brushes to the exact same drop bar structure without having to modify it. Instead, it is possible to select another kind of brush holder capable of holding the specific brush. The brush holders may then be attached to the drop bar structure in the exact same way, independent on the kind of brush mounted therein.

According to some embodiments, the brush is arranged on the drop bar such that brush bristles of the brush are directed substantially perpendicular to the common engagement surface.

An advantage with these embodiments may be that it is possible to insert and/or remove the brush from the drop bar structure in an easy way. By this arrangement, the brush may seal the gap, and especially the clearance in an efficient way.

According to some embodiments, the brush is arranged on the drop bar such that brush bristles of the brush form an oblique angle with the common engagement surface.

An advantage with these embodiments may be that it provides for an even more efficient sealing system compared to when the bristles are directed perpendicular to the common engagement surface. By this arrangement, a more flexible brush seal may be provided as the brush bristles more easily adjust to the shape of the common engagement surface.

According to some embodiments, the machine further comprises a further sealing system connected to the support structure of the furnace and arranged along the traveling direction, the further sealing system being arranged to be in engagement with the common engagement surface so as to cover the gap over at least parts of the gap length, and wherein the further sealing system is arranged at a spaced distance from the sealing system such that an elongate cavity is formed therebetween.

The further sealing system may be advantageous as it allows increasing the overall sealing efficiency. Moreover, it allows establishing a high-pressure zone between the sealing systems to further prevent gas penetrating the sealing systems. This may be of importance especially in situations where it is unavoidable to operate a process or a portion of a process of the machine at higher pressure than the ambient pressure outside of the machine. If purging the double seal arrangement with air or another suitable purge gas at a higher pressure than each one of the process and the ambient external pressure, the purge gas will leak into the process and out into the environment, which will effectively prevent process gas from reaching the environment.

According to some embodiments, the further sealing system comprises:

a series of leaf members which are partially overlapping so as to form a sealing surface, wherein each leaf member of the series of leaf members is connected to the support structure at a first end thereof, and in engagement with the common engagement surface at a second, opposite, end thereof.

By the term "leaf member" is here meant an individual member of a series of leaf members that together form a flexible seal. A leaf member is a substantially planar member with a thickness significantly smaller than the length and width of the leaf member. The width of a leaf member is the dimension of the leaf member in the traveling direction of the pallet cars, whereas the length of a leaf member is a dimension of the leaf member in a direction perpendicular to the traveling direction. The leaf member may have a substantially rectangular or squared shape, but is not limited to these shapes and may also have an oval, circular, triangular or any other planar shape. The leaf member may be made of a flexible material, such as to provide a spring-like or self-biasing function.

According to some embodiments, the further sealing system comprises a further one or more drop bars distributed after each other along the traveling direction.

According to some embodiments, each drop bar of the further one or more drop bars includes a brush arranged on the drop bar structure such that the brush is configured to be in engagement with the common engagement surface such that the further one or more drop bars covers the gap over at least parts of the gap length.

According to some embodiments, the sealing system and the further sealing system is arranged in parallel to each other so as to cover the gap along a common gap width which extends over at least a firing zone and a cooling zone of the furnace.

In the transition from the firing zone and the cooling zone, there may be arranged an after firing zone. Leakage from this zone may cause hazards as combustible gases from the furnace may mix with oxidants from ambient air, thereby creating a risk of unwanted ignition.

An advantage with these embodiments may be that leakage in these zones may be minimized or eliminated, hence minimizing the risk of unwanted ignition or explosion. Thus, by this arrangement, the seal may be even further improved.

A further advantage of these embodiments may be that the same sealing arrangement continues from the firing zone into the cooling zone such that no gaps are created in the transition between the firing zone and the cooling zone. By the present arrangement, a sealing system that may minimize leakage either into, or out from, the furnace may be provided.

A further advantage with these embodiments may be that the thermal load on the outmost of the two sealing systems may be lowered.

A further advantage with these embodiments may be that the sealing system may be arranged along full length of the furnace, and that the further sealing system may optionally be arranged only in zones in which a dual sealing system may be required, such as in the firing zone and the cooling zone.

According to some embodiments, there may be further provided a gas flow in the elongate cavity between the sealing system and the further sealing system. The gas in the gas flow may be, but is not limited to, air, or inert gases such as Nitrogen, or any other suitable gas. Given as non-limiting examples, the gas may be supplied to the elongate cavity from a supply of pressurized air, or air from the cooling zone may be supplied.

An advantage with these embodiments may be that the gas flow may cool the sealing system and the further sealing system, enabling the use of even higher temperatures in the furnace than would otherwise be possible in order not to thermally damage the sealing system or the further sealing system.

A further advantage with these embodiments may be that, when providing an air flow through the cavity formed between the sealing system and the further sealing system, the high pressure in the cavity will be easier to keep at the right level.

According to a second aspect, there is provided a method for attaching a brush to a drop bar in a sealing system for a machine for thermal treatment of bulk material, wherein the sealing system comprises one or more drop bars being configured to be distributed after each other along a traveling direction, and wherein the machine comprises a stationary furnace which presents an attachment structure, and a plurality of pallet cars traveling through the furnace along a traveling direction, said plurality of pallet cars together defining, at a lateral side thereof, a common engagement surface which extends through the furnace along the traveling direction, wherein a gap is defined between the attachment structure of the furnace and the common engagement surface of the plurality of pallet cars, the method comprising:

dismantling at least one drop bar of the one or more drop bars from the machine, attaching a brush, or a brush holder which carries the brush, to the at least one drop bar, and mounting said at least one drop bar back on the machine, wherein the brush or brush holder is attached to the drop bar such that the brush is configured to be in engagement with the common engagement surface when in use on the machine.

According to some embodiments, the method further comprises:

milling a recess in each drop bar of the one or more drop bars, and inserting the brush or the brush holder into the recess.

According to some embodiments, attaching the brush or the brush holder to the at least one drop bar comprises clamping the brush or the brush holder towards the at least one drop bar by means of a fastening plate.

According to a third aspect, there is provided a sealing system for a machine for the thermal treatment of bulk material, wherein the machine comprises a stationary furnace which presents an attachment structure, and a plurality of pallet cars traveling through the furnace along a traveling direction, said plurality of pallet cars together defining, at a lateral side thereof, a common engagement surface which extends through the furnace along the traveling direction, wherein a gap is defined between the attachment structure of the furnace and the common engagement surface of the plurality of pallet cars, the sealing system comprising:

one or more drop bars being configured to be distributed after each other along the traveling direction;

wherein each drop bar of the one or more drop bars includes a brush arranged on the drop bar such that the brush is configured to be in engagement with the common engagement surface such that the one or more drop bars covers the gap over at least parts of the gap length.

Effects and features of the second and third aspects are largely analogous to those described above in connection with the first aspect. Embodiments mentioned in relation to the first aspect are largely compatible with the second and third aspect. It is further noted that the inventive concepts relate to all possible combinations of features unless explicitly stated otherwise. A further scope of applicability of the present invention will become apparent from the detailed description given below. However, it should be understood that the detailed description and specific examples, while indicating preferred embodiments of the invention, are given by way of illustration only, since various changes and modifications within the scope of the invention will become apparent to those skilled in the art from this detailed description.

Hence, it is to be understood that this invention is not limited to the particular component parts of the device described or steps of the methods described as such device and method may vary. It is also to be understood that the terminology used herein is for purpose of describing particular embodiments only and is not intended to be limiting.

It must be noted that, as used in the specification and the appended claim, the articles "a", "an", "the", and "said" are intended to mean that there are one or more of the elements unless the context clearly dictates otherwise. Thus, for example, reference to "a unit" or "the unit" may include several devices, and the like. Furthermore, the words "comprising", "including", "containing" and similar wordings does not exclude other elements or steps.

BRIEF DESCRIPTION OF THE DRAWINGS

The above, as well as additional objects, features and advantages of the present invention, will be better understood through the following illustrative and non-limiting detailed description of embodiments of the present invention, with reference to the appended drawings, where the same reference numerals may be used for similar elements, and wherein:

FIG. 5A illustrates parts of the sealing system comprising a series of leaf members.

FIG. 5B illustrates three overlapping leaf members.

FIG. 6A illustrates parts of the sealing system comprising two series of leaf members and a series of flexible blanket members.

FIG. 6B illustrates three overlapping leaf members and a flexible blanket member.

DETAILED DESCRIPTION OF PREFERRED EMBODIMENTS

The present invention will now be described more fully hereinafter with reference to the accompanying drawings, in which currently preferred embodiments of the invention are shown. This invention may, however, be embodied in many different forms and should not be construed as limited to the embodiments set forth herein; rather, these embodiments are provided for thoroughness and completeness, and fully convey the scope of the invention to the skilled person.

Figure 7:
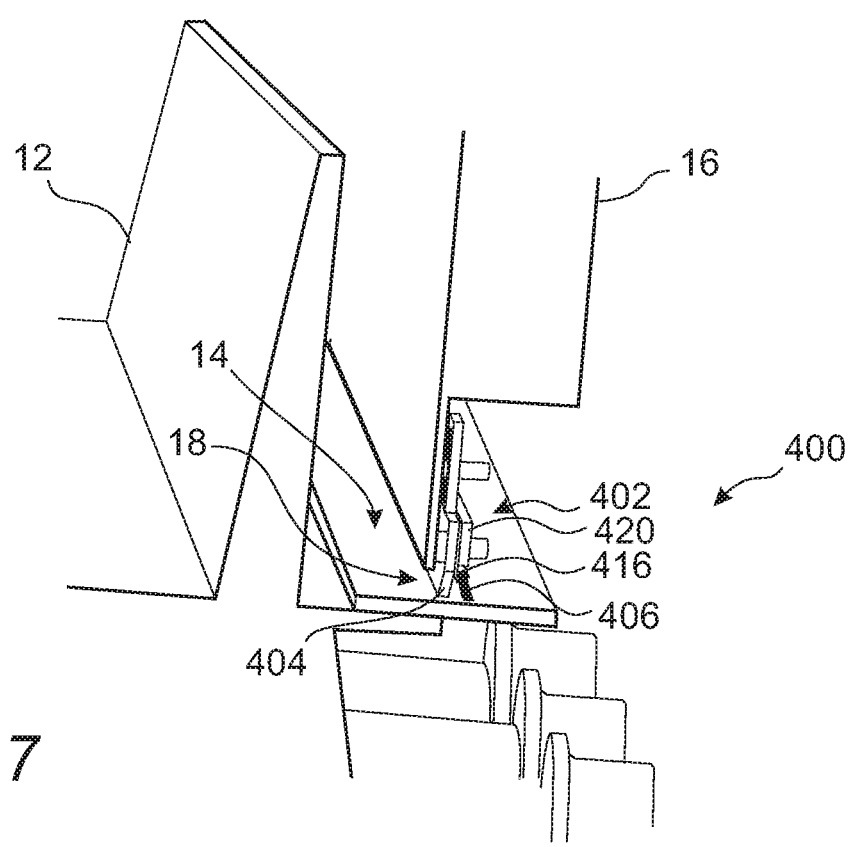
FIG. 7 illustrates part of a machine comprising a sealing system.

The present disclosure relates to a machine for thermal treatment of bulk material and a sealing system for the machine. With reference to FIG. 1 of the present disclosure, the machine for thermal treatment of bulk material will be discussed. For the sake of clarity, a number of different seal designs that may be used in conjunction with the machine will be discussed in the following sections. With reference to FIGS. 2-6 of the present disclosure, a sealing system comprising a leaf seal design will be discussed. With reference to FIGS. 7-9 of the present disclosure, a sealing system comprising a brush seal design will be discussed. With reference to FIGS. 10-14 of the present disclosure, a sealing system comprising different combinations of seal designs will be discussed.

In particular, the present disclosure relates to a single sealing system according to the sealing system discussed in connection with FIGS. 7-9. Further, the present disclosure also relates to dual sealing systems, or sealing assemblies, being any combination of sealing systems discussed throughout this disclosure in connection with FIGS. 2-9.

Figure 1A:
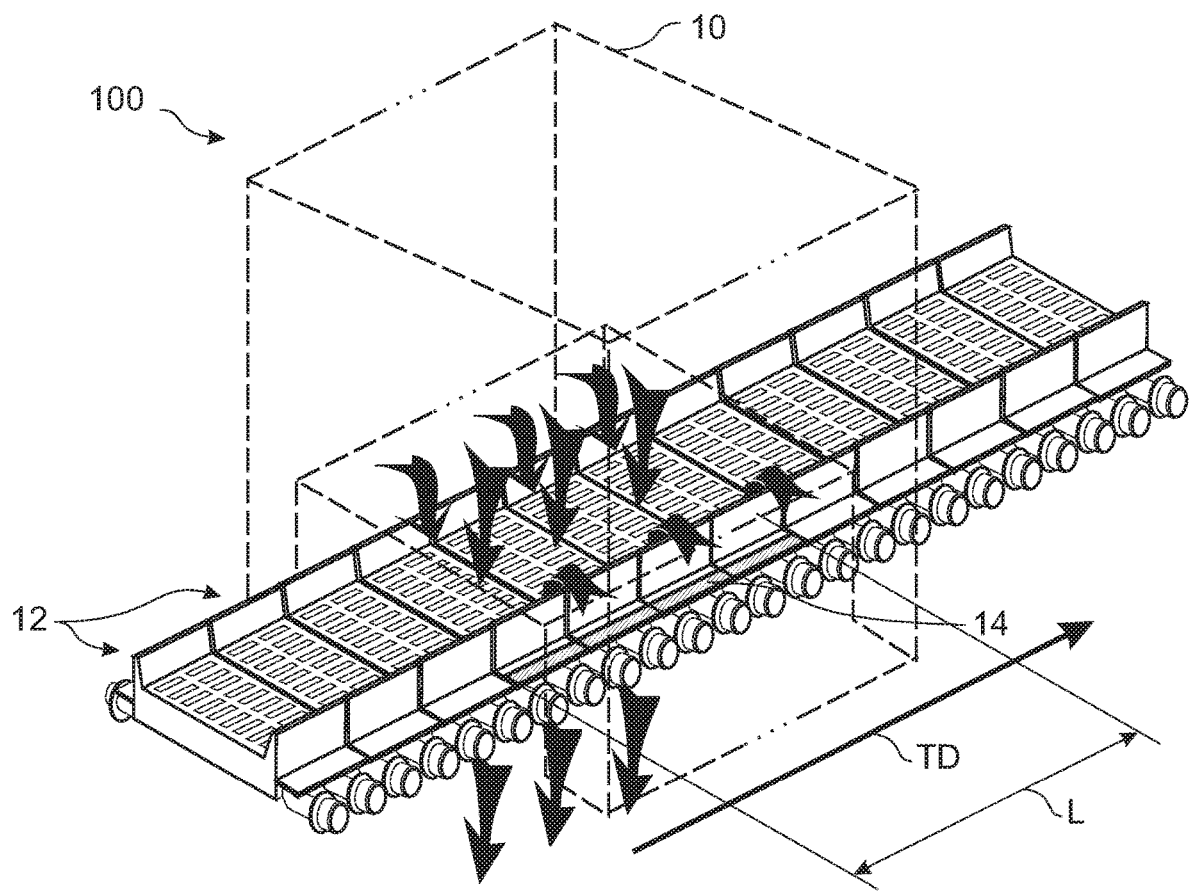
FIG. 1A is a perspective view of a machine for thermal treatment of bulk material.
Figure 1B:
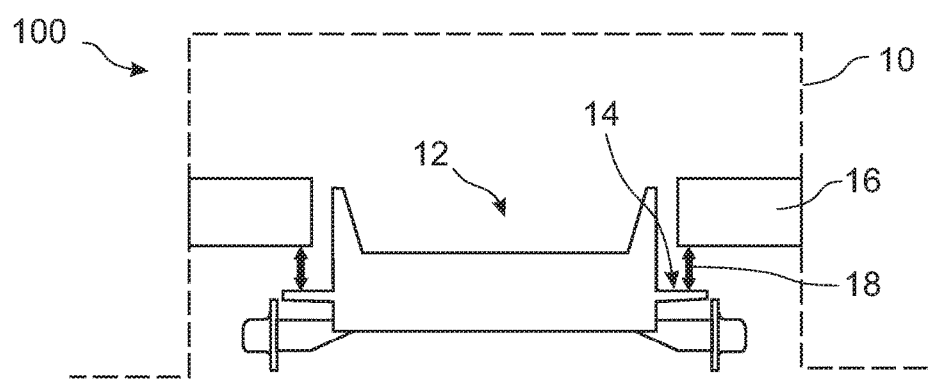
FIG. 1B is a cross section of a machine for thermal treatment of bulk material.

FIGS. 1A-1B illustrate a part of a machine 100 for thermal treatment of bulk material, such as metal ore. However, it should be understood that only a part of the machine 100 is illustrated in the figures and hence, the machine 100 may comprise more features than discussed herein. The machine 100 may be any machine for thermal treatment of bulk material known in the art.

The machine 100 comprises a stationary furnace 10 configured to process bulk material. By processing the material, is herein meant, drying, heating or cooling the bulk material using the stationary furnace 10.

The machine 100 further comprises a plurality of pallet cars 12. The pallet cars 12 are configured to transport the bulk material through the stationary furnace 10. The pallet cars 12 are traveling through the stationary furnace 10 on a set of rails (not shown). The pallet cars 12 are traveling through the stationary furnace 10 along a traveling direction TD. The traveling direction TD extends along a substantially horizontal direction.

The pallet cars 12 are arranged with holes in the bottom plate for receiving a gas flow through the bottom plate. Although not illustrated in FIGS. 1A-1B, the machine 100 comprises an arrangement below the track of the pallet cars 12 that by suction generates a flow of hot air or gas above the pallet cars 12 through the bulk material and the pallet cars 12. Such an arrangement may be, but is not limited to, wind boxes. Further, generation of gas or air flow may alternatively be used for cooling the bulk material in other parts of the machine 100.

The stationary furnace 10 presents a support structure 16. The support structure 16 is a steady and stationary part of the furnace 10, located on either lateral side of the furnace 10. The support structure 16 is arranged such that when the plurality of pallet cars 12 travel through the furnace 10, the lateral sides of the pallet cars 12 pass in the vicinity of the support structure 16. The support structure 16 together with the pallet cars 12 defines a portion of the boundary between the interior of the furnace 10 and the ambient air.

The plurality of pallet cars 12 together define a common engagement surface 14. The common engagement surface 14 extends through the stationary furnace 10 along the traveling direction TD. The common engagement surface 14 and the support structure 16 of the furnace 10 together define a gap 18 therebetween. The gap 18 has a gap length L along the traveling direction through the stationary furnace 10 along the traveling direction TD.

The machine 100 further comprises a sealing system (not illustrated in FIG. 1). The sealing system is configured to seal the gap defined between the common engagement surface 14 and the support structure 16 so as to prevent gas, droplets and/or particulate matter from passing through the gap 18. The sealing system will be discussed in more detail in connection with FIGS. 2-11.

Figure 2A:
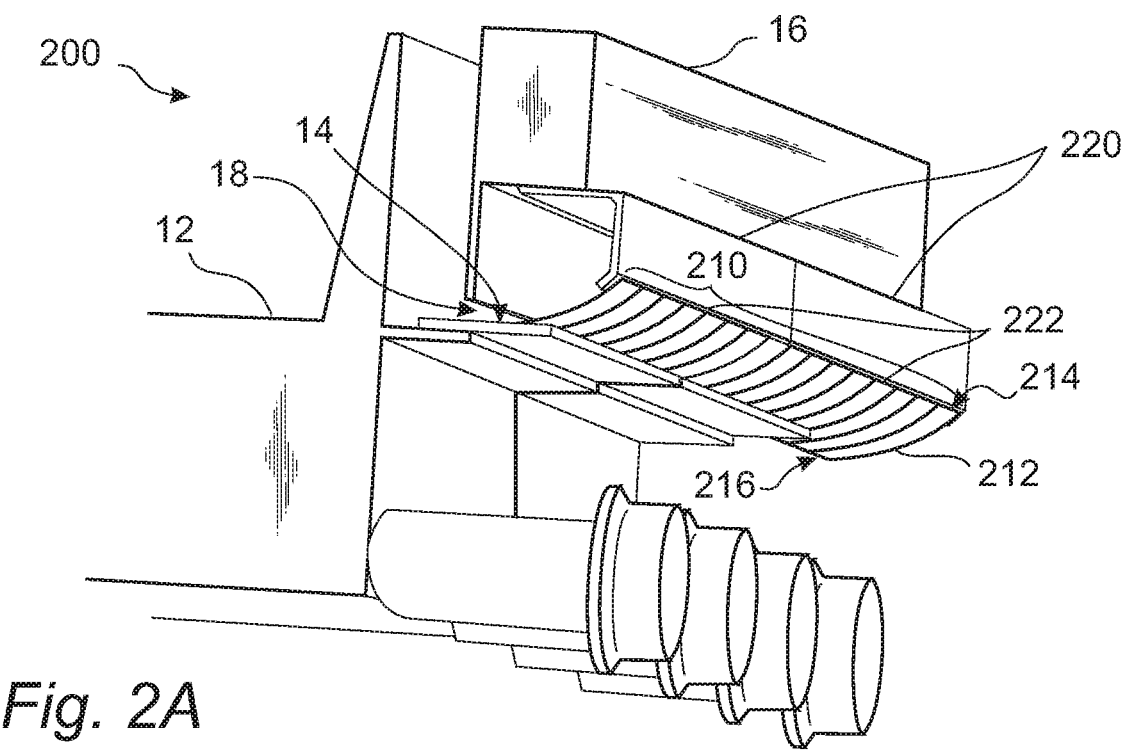
FIGS. 2A-2B illustrate a sealing system comprising a series of leaf members, as arranged when connected to the support structure of the machine.

FIG. 2A illustrates a sealing system 200 as arranged when connected to the support structure 16 of the machine 100. As discussed in relation to FIGS. 1A-1B, a gap 18 defined between the support structure 16 of the furnace 10 and the common engagement surface 14 of the plurality of pallet cars 12. A purpose of the sealing system 200 is to seal the gap 18 between the support structure 16 and the common engagement surface 14, so as to prevent gas, droplets and/or particulate matter from passing through the gap 18. In the present example embodiment, the sealing system 200 comprises a series 210 of leaf members 212 which are partially overlapping so as to form a sealing surface. The leaf members 212 in the present embodiment have a rectangular shape, however it is conceivable that leaf members in other embodiments may have different shapes. The sealing system 200 of the present embodiment further comprises a number of brackets 220. In FIG. 2A two brackets 220 are illustrated, although it should be understood that only a portion of the machine 100 is illustrated, and thus the number of brackets 220 in the full machine 100 may be different. Each of the brackets 220 comprises an attachment surface 222, onto which a first end 214 of each of the leaf members 212 is connected to a bracket 220. Further, the brackets 220 are attached to the support structure 16. In the present example embodiment, the attachment surface 222 of each of the brackets 220 is angled with respect to the engagement surface 14. The angled attachment surface 222 provides self-biasing of the leaf members 212 attached thereto, towards the common engagement surface 14. The angled attachment surface 222 may form an angle in relation to the common engagement surface being 10 to 50 degree. However, larger, or smaller, angles are also conceivable.

The leaf members of the disclosure, such as the leaf members 212 may be made of thin spring steel. A property of such spring steel is that it is resilient and may thus return to its original shape despite being subjected to deflection and twisting. Leaf members of the disclosure may however alternatively be made of other types of material. By way of example, the leaf members may be made of, but are not limited to, stainless steel, iron, copper, polytetrafluoroethylene or fluoropolymers, such as used in Teflon™, plastics and composites such as steel with a rubber tip.

As illustrated in FIG. 2A, the otherwise planar leaf members 212 take a bent shape as a result of the angled attachment surface 222 such that a second end 216 of each of the leaf members 212 in engagement with the engagement surface 14 is pushed against the engagement surface 14 by the resilient force of the leaf members 212. By the present arrangement the gap 18 between the support structure 16 and the common engagement surface 14 is covered and thereby sealed such as to prevent passage of gas, droplets and/or particulate matter from the interior of the furnace to the ambient air, or vice versa.

Figure 2B:
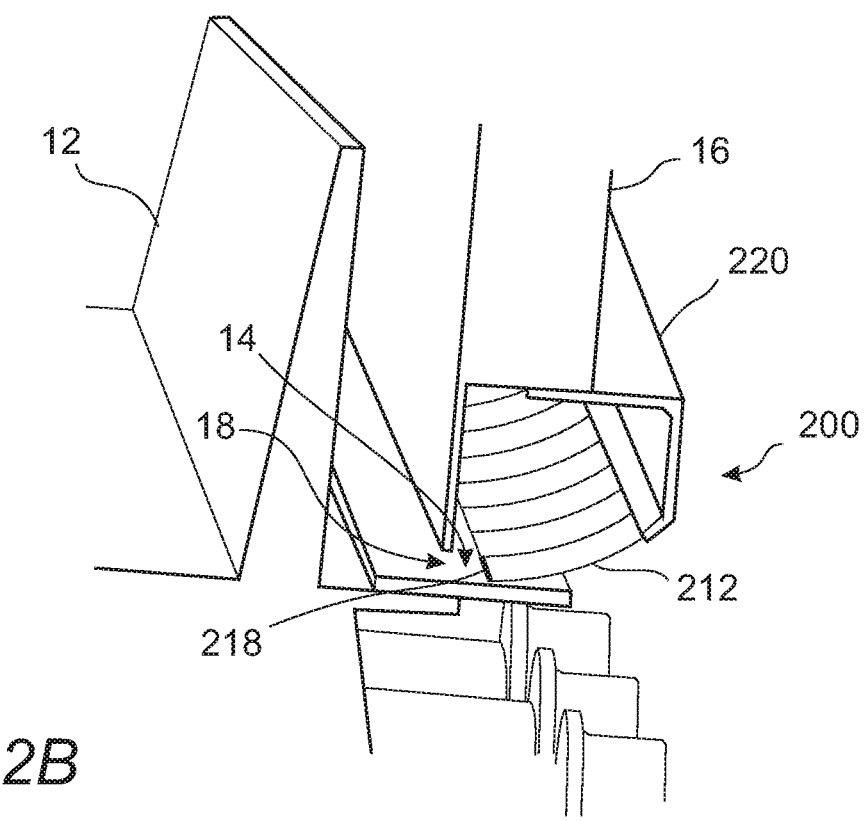

FIG. 2B illustrates the same sealing system 200 as in FIG. 2A from a different point of view. Further to what has been discussed above, FIG. 2B illustrates that a significant portion of a length of each of the leaf members 212 is arranged in an overlapping manner with the common engagement surface 14. As the plurality of pallet cars 12 travel through the furnace an edge 218 of the second end 216 of each of the leaf members 212 may wear off. If the leaf members 212 were arranged in a planar manner, the wearing of the edge 218 would eventually result in loss of contact between the leaf members 212 and the common engagement surface 14, whereby the seal across the gap 18 would be impaired. However, as the leaf members 212 are arranged to be self-biased into engagement with the common engagement surface 14, the resilience of each leaf member 212 will push the second end 216 of the leaf member 212 towards the common engagement surface 14 even as the edge 218 wears off. By the present arrangement, contact between the leaf members 212 and the common engagement surface 14 is maintained, ensuring continued seal.

Figure 3:
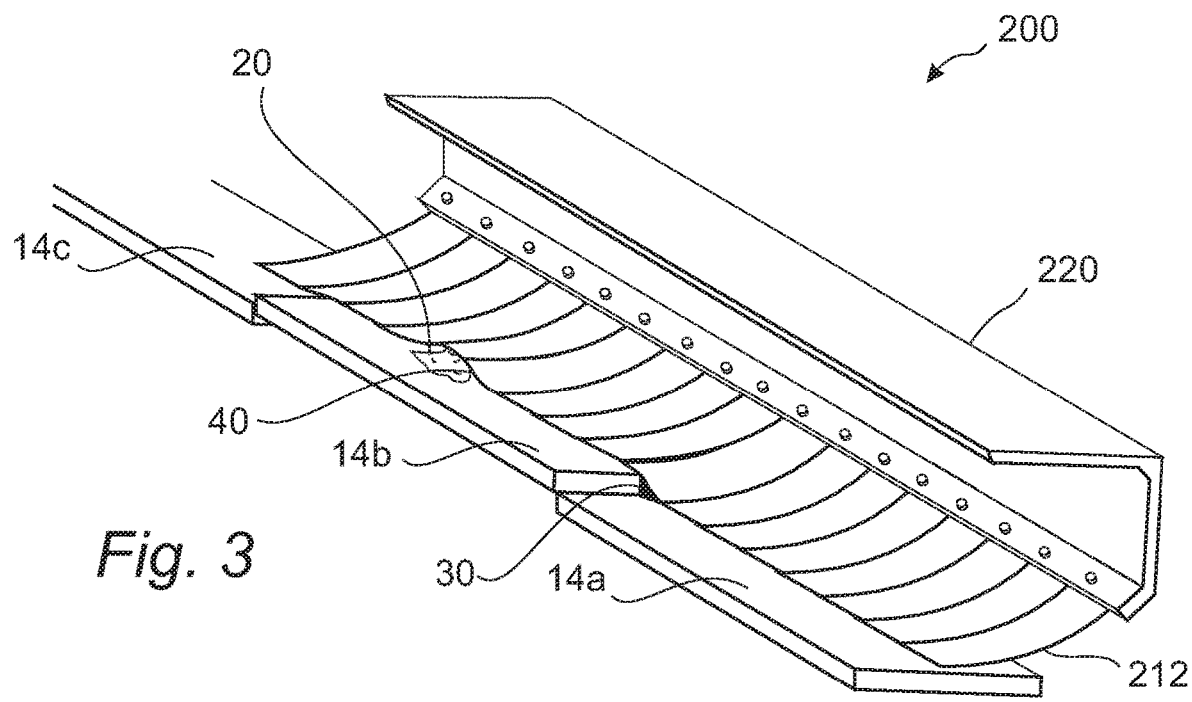
FIG. 3 illustrates a sealing system, providing some more details on the sealing functionality of the concept of using leaf seals.

FIG. 3 illustrates the sealing system 200 providing some more details on the sealing functionality of the concept of using leaf seals. A problem of sealing the gap 18 between the common engagement surface 14 and the support structure 16 may be that the engagement surfaces 14a, 14b, 14c of individual pallet cars 12 (pallet cars not shown in the present figure), may be shifted in a vertical direction with respect to each other. Such a shift may be due to slight variation in manufacturing of the pallet cars 12 or, more likely, that the pallet cars 12 sag over time partly due to a combination of carried heavy load and harsh environment with extreme temperatures in the furnace 10. Such a vertical shift is illustrated in FIG. 3 with the individual engagement surfaces 14a, 14b, 14c having different vertical positions. The leaf members 212 are arranged to be in good physical contact with the flat engagement surfaces 14a, 14b, 14c. However, at a transition from one engagement surface 14a to another engagement surface 14b, the common surface is no longer flat due to the difference in vertical position and thus the leaf members 212 are deformed to adjust to the shifting structure of the surface due to the resilience of the material out of which the leaf members 212 are made. It is illustrated in FIG. 3 that said deformation substantially occurs for the individual leaf members 212 at such transitions, whereas adjacent leaf members 212 are to a large extent unaffected by the transition and hence maintain contact with the engagement surfaces 14a, 14b, 14c. The present arrangement results in only a small gap 30 at the transition as a result of deformation of an individual leaf member 212. Consequently, only a small leak may result due to differences in vertical position of the pallet cars 12, thus maintaining high sealing efficiency.

Figure 4:
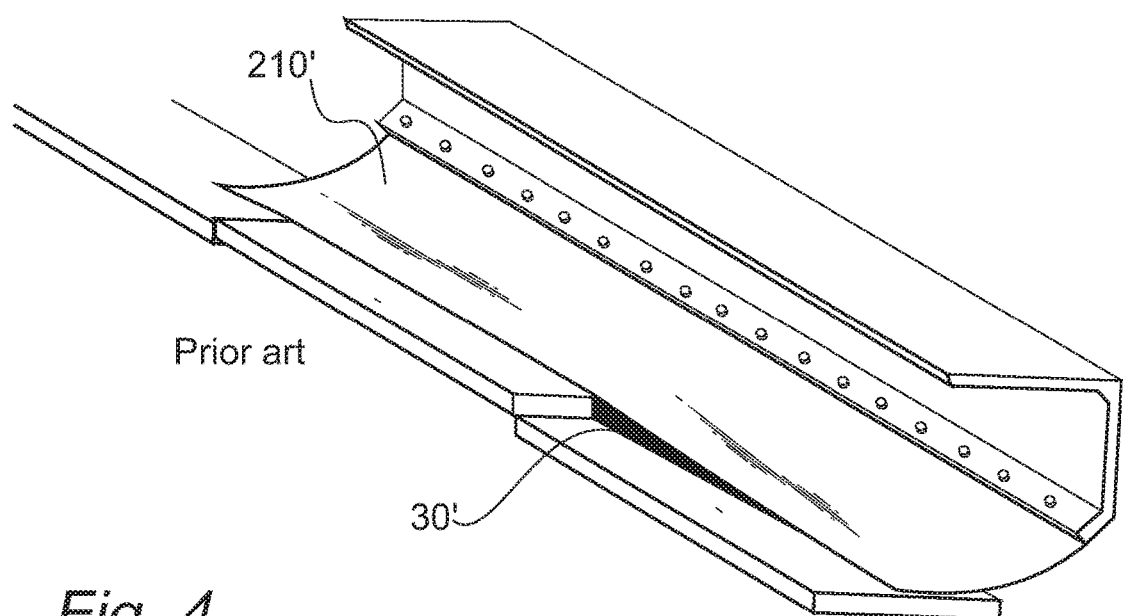
FIG. 4 illustrates a drawback that would occur if a more conventional long flexible seal member were to be used.

FIG. 4 illustrates a drawback that would occur if a more conventional long flexible seal member 210' were to be used. The situation is similar to the one just described in relation to FIG. 3, wherein the engagement surface 14 of individual pallet cars 12 are shifted in the vertical direction with respect to each other. Since the long flexible seal 210' is continuous it will be affected by the shift not only in the vicinity of the transition between individual pallet cars 12, but also along a larger portion of the common engagement surface 14. This may cause a significantly larger gap 30' between the long flexible seal member 210' and the common engagement surface 14, resulting in significantly larger leak through the seal than compared to the sealing system 200 based on a series 210 of leaf members 212.

Returning now to FIG. 3, a further situation that may occur in sealing systems of a machine 100 for thermal treatment of bulk material is illustrated, namely that pellets may occasionally get stuck underneath the seal. In FIG. 3, a pellet 20 is illustrated to be stuck between the series 210 of leaf members 212 and an individual engagement surface 14b. The stuck pellet 20 may lift up some of the leaf members 212, which are thus deformed such that they are bent upwards. Said deformation substantially occurs for the individual leaf members 212 in contact with the pellet 20, whereas adjacent leaf members 212 to a large extent are unaffected by the stuck pellet 20 and hence maintain contact with the engagement surfaces 14a, 14b, 14c. Similarly to the situation at the transition between individual pallet cars 12, the present arrangement results in only a small gap 40 in the vicinity of the pellet 20 as a result of deformation of one or a few individual leaf members 212. Consequently, only a small leak may result due to the stuck pellet 20, thus maintaining high sealing efficiency.

FIG. 5A illustrates the sealing system 200 viewed in the traveling direction TD. The leaf member 212 is illustrated to be connected to the bracket 220 by means of a bolt 224 and nut 226 arrangement. Bolts 224 are inserted into through holes of the bracket 220 and into through holes 217 of the leaf member 212. Nuts 226 are tightened onto the other end of the bolts 224, attaching the leaf member 212 to the bracket 220. To simplify replacement of individual leaf members, the bolts 224 may be pre-welded onto the bracket 220. It should be understood that also other means for connecting leaf members 212 to the bracket 220 are conceivable.

In FIG. 5A it is further illustrated that the bracket 220 comprise an attachment surface 222 onto which the leaf member 212 is connected to the bracket 220. The attachment surface 222 is angled with respect to the engagement surface 14. The present arrangement provides the leaf member 212 with a curvature which due to the resilience of the material out of which the leaf member 212 is made, results in a self-biased state, thereby pushing the second end 216 of the leaf member 212 towards the engagement surface 14.

FIG. 5B illustrates three leaf members 212a, 212b, 212c viewed in a direction perpendicular to the traveling direction TD. The three leaf members 212a, 212b, 212c are partially overlapping so that a through hole 217 of leaf member 212a coincides with a through hole 217 of the adjacent leaf member 212b and so on. The ratio of overlap may vary between different embodiments. FIG. 5B illustrates that in the present embodiment a leaf member 212a overlaps with the consecutive leaf member 212b by typically less than 50%.

FIG. 6A illustrates a sealing system 300 viewed in the traveling direction TD. The sealing system comprises brackets 220 each of which having an attachment surface 222. Onto the attachment surface 222 is a first series 310 of leaf members 312 connected. The leaf members 312 in the first series 310 of leaf members 312 are partially overlapping so as to form a sealing surface. It should be understood that the first series 310 of leaf members 312 may be of the same type as in the series 210 of leaf members 212 in sealing system 200, or they may be of a different type.

Further, the sealing system 300 comprises a series 330 of flexible blanket members 332. Each flexible blanket member 332 of the series 330 of flexible blanket members 332 is connected to the bracket at a first end 334 of the flexible blanket member 332. The series 330 of flexible blanket members 332 is positioned adjacent the first series 310 of leaf members 312 so as to cover overlapping edges of adjacent leaf members 312. The flexible blanket members of the disclosure may be made of, but are not limited to, Neopren (i.e. polychloroprene), welding blanket of woven blanket biomass, synthetic polymers such as Nylon, woven or nonwoven fiber blanket material, gasket material made of polytetrafluoroethylene or fluoropolymers, such as used in Teflon™.

Further, the sealing system 300 comprises a second series 340 of leaf members 342. Each leaf member 342 of the series 340 of leaf members 342 is connected to the bracket at a first end 344 of the leaf member 342. It should be understood that the second series 340 of leaf members 342 may be of the same type as in the first series 310 of leaf members 312, or they may be of a different type. The second series 340 of leaf members 342 is positioned adjacent the series 330 of flexible blanket members 332 on an opposite side with respect to the first series 310 of leaf members 312, so as to sandwich the series 330 of flexible blanket members 332 between the first series 310 and the second series 340.

The leaf members 312, 342 and the flexible blanket members 332 are illustrated to be connected to the bracket 220 by means of a bolt 224 and nut 226 arrangement. Bolts 224 are inserted into through holes of the bracket 220 and into through holes 317 of the leaf member 312, 342 and the flexible blanket members 332. Nuts 226 are tightened onto the other end of the bolts 224, attaching the leaf members 312, 342 and the flexible blanket members 332 to the bracket 220. To simplify replacement of individual leaf members, the bolts 224 may be pre-welded onto the bracket 220. It should be understood that also other means for connecting leaf members 312, 342 and the flexible blanket members 332 to the bracket 220 are conceivable.

In FIG. 6A it is further illustrated that the bracket 220 comprise an attachment surface 222 onto which the leaf members 312, 342 and the flexible blanket members 332 are connected to the bracket 220. The attachment surface 222 is angled with respect to the engagement surface 14. The present arrangement provides the leaf members 312, 342 and the flexible blanket member 332 with a curvature which due to the resilience of the material out of which they are made, results in a self-biased state, thereby pushing the second ends 316, 336, 346 in a direction towards the engagement surface 14. In the illustrated example embodiment, the flexible blanket member 332 is shorter in length as compared to the leaf members 312, 342, such that the flexible blanket member 332 does not extend to reach the edge 318 of the second end 316 of the leaf member 312. The present arrangement allows the second end 316 of the leaf member 312 to be in direct engagement with the common engagement surface 14. An advantage with the present arrangement is that good sealing effect is provided, since the engagement of the leaf members 312 with the common engagement surface 14, which constitute the primary seal, is ensured.

FIG. 6B illustrates three leaf members 312a, 312b, 312c viewed in a direction perpendicular to the traveling direction TD. The three leaf members 312a, 312b, 312c are partially overlapping so that a through hole 317 of leaf member 312a coincides with a through hole 317 of the adjacent leaf member 312b and so on. The ratio of overlap may vary between different embodiments. FIG. 6B illustrates that in the present embodiment a leaf member 312a overlaps with the consecutive leaf member 312b by typically less than 50%. In comparison to the three leaf members 312a, 312b, 312c also a flexible blanket member 332 is illustrated in FIG. 6B. As explained in relation to FIG. 6A, also the flexible blanket members 332 are connected by a bolt 224 and nut 226 arrangement, using through holes 317 in the flexible blanket members. The flexible blanket member 332 is wider than the leaf members 312 such that the flexible blanket member 332 covers the three leaf members 312a, 312b, 312c, in the present embodiment.

FIG. 7 illustrates a sealing system 400 as arranged when connected to the support structure 16 of the machine 100. The sealing system 400 is also illustrated in isolation in FIGS. 8A-C. In the example embodiment, the sealing system 400 comprises a drop bar 402 having an elongated extension 401 (illustrated in FIG. 8A). The drop bar 402 is arranged along the traveling direction TD so as to form a sealing surface S (illustrated in FIG. 8A). However, it should be understood, as only a part of the sealing system 400 is illustrated in FIG. 7, the sealing system 400 may comprise more than one drop bar 402. If the sealing system 400 comprises more than one drop bar 402, the more than one drop bars 402 are distributed after each other along the traveling direction TD so as to form the sealing surface S.

Figure 8A:
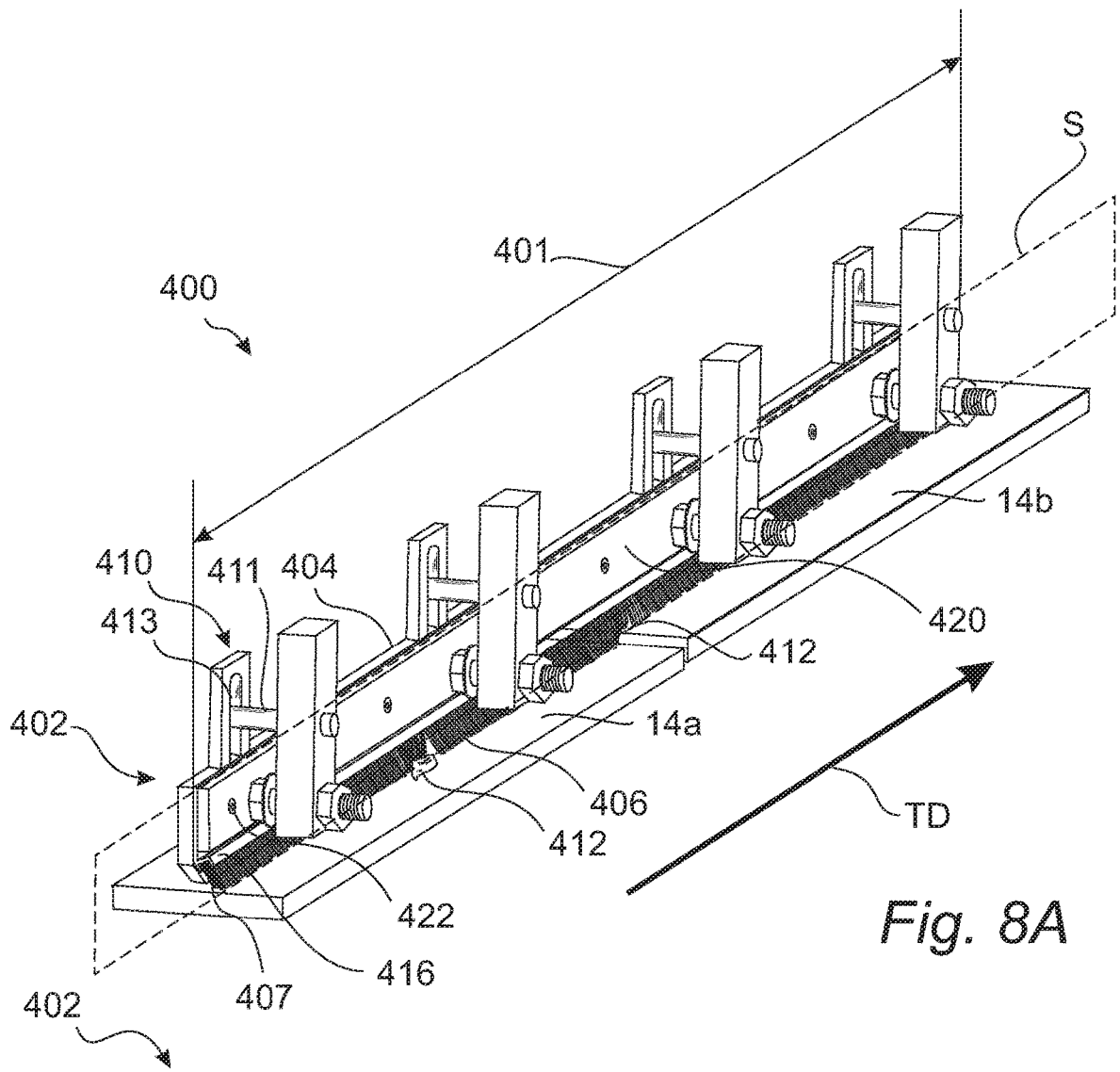
FIG. 8A is a perspective view of a sealing system which comprises a drop bar including a drop bar structure and a brush.

The drop bar 402 includes a drop bar structure 404 and a brush 406, wherein the brush comprises a plurality of bristles 407 (illustrated in FIG. 8A). The brush 406 is carried by the drop bar structure 404 such that the brush 406 is configured to be in engagement with the common engagement surface 14 of the pallet cars 12. In the example embodiment, the brush 406 is forced, by gravity, to be in engagement with the common engagement surface 14. Other engagement means are however conceivable, such as biasing by e.g. a spring. The attachment of the brush to the drop bar structure will be further discussed in relation to FIGS. 8C and 9.

Figure 8B:
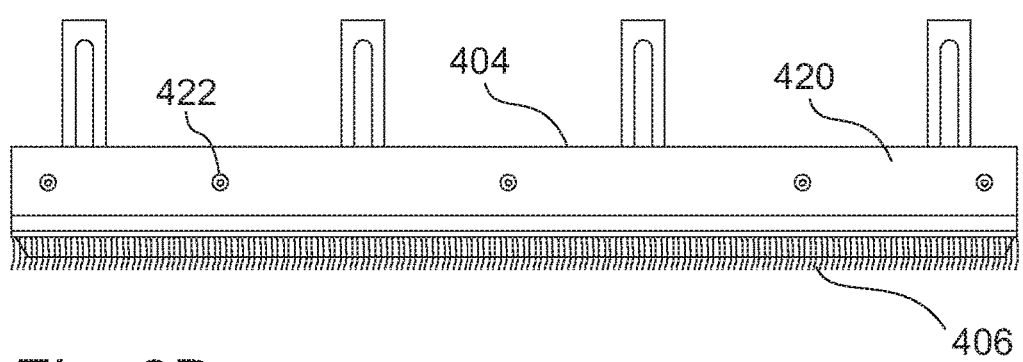
FIG. 8B illustrates a front view of the sealing system illustrated in FIG. 8A.

The drop bar structure 404 comprises connecting means 410 for connecting the sealing system 400 to the machine 100. As best illustrated in FIGS. 8A and 8B, in the example embodiment, the drop bar structure 404 comprises four connecting means 410, but it should be understood, as only a part of the machine 100 and the sealing system 400 is illustrated in the figure, that the drop bar structure 404 may comprise any number of connecting means 410. Connecting means for drop bars are well known in the art and may for example be embodied by an engagement between a pin 411 and an elongate opening 413, as illustrated in FIG. 8A.

The drop bar structure 404 and the brush 406 together forms the sealing surface S that covers the gap 18 over at least parts of the gap length L.

FIG. 8A illustrates the sealing system 400 in isolation and provides more details thereof. The sealing system 400 comprises the drop bar 402, wherein the drop bar 402 includes the drop bar structure 404 and the brush 406. In this example embodiment, the drop bar 402 further comprises a brush holder 416 which is configured to hold the brush 406. A fastening plate 420 is configured to clamp the brush holder 416 towards the drop bar structure 404. The fastening plate 420 is clamped towards the drop bar structure 404 by means of screws or bolts 422. FIG. 8A further illustrates how the brush 406 is configured to be in engagement with the common engagement surface 14 (illustrated here by surfaces 14a and 14b of two adjacent pallet cars), of the pallet cars 12. In the example embodiment, it is further illustrated that the brush 406 extends over the elongated extension 401 so as to form the sealing surface S.

A problem of sealing the gap 18 between the common engagement surface 14 and the support structure 16 may be that the engagement surfaces 14a, 14b of individual pallet cars 12 (pallet cars not shown in the present figure), may be shifted in a vertical direction with respect to each other. Such a shift may be due to slight variation in manufacturing of the pallet cars 12 or, more likely, that the pallet cars 12 sag over time partly due to a combination of carried heavy load and harsh environment with extreme temperatures in the furnace. Such a vertical shift is illustrated in FIG. 8A with the individual pallet cars 14a, 14b having different vertical positions. The bristles 407 of the brush 406 are arranged to be in good physical contact with the flat engagement surfaces 14a, 14b. However, at a transition from one engagement surface 14a to another engagement surface 14b, the surface is no longer flat due to the difference in vertical position and thus the bristles 407 of the brush 406 are deformed to adjust to the shifting structure of the surface due to the resilience of the material out of which the bristles 407 of the brush 406 are made. It is illustrated in FIG. 8A that said deformation substantially occurs for one or more bristles, independently of the adjacent bristles, at such transitions, whereas adjacent bristles are to a large extent unaffected by the transition and hence maintain contact with the engagement surface 14a, 14b. The present arrangement results in only a small gap 412 at the transition as a result of deformation of one or more bristles of the brush 406. Consequently, only a small leak may result due to differences in vertical position of the pallet cars, thus maintaining high sealing efficiency.

FIG. 8B illustrates a front view of the sealing system 400 illustrated in FIG. 8A. Further to what have been discussed above, FIG. 8B illustrates that each of the connecting means 410 are arranged with a distance from each other. In the example embodiment, each of the connecting means 410 are arranged with the same distance from each other, although it should be understood that each of the connecting means 410 may be arranged with different distances from each other as well.

Figure 8C:
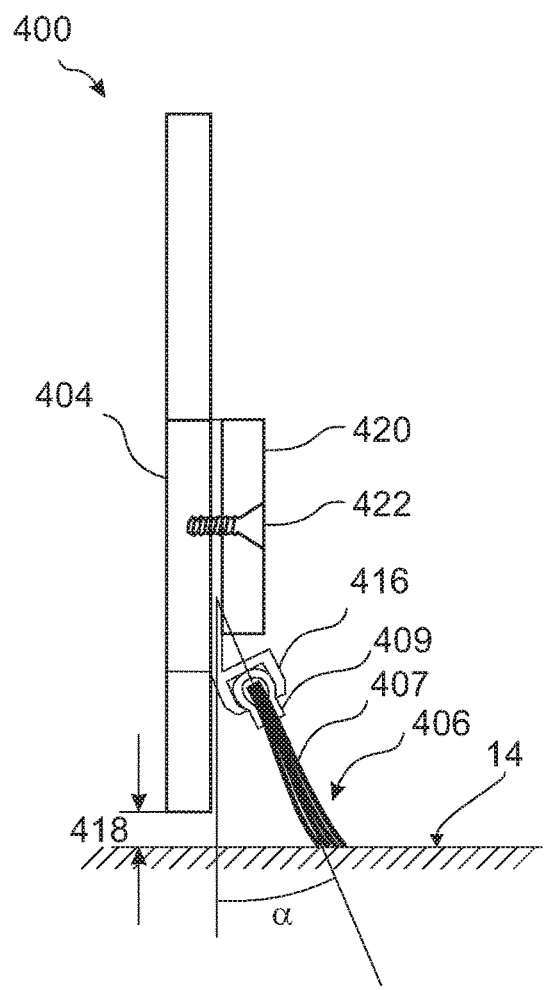
FIG. 8C illustrates a cross section of the sealing system illustrated in FIGS. 8A and 8B, wherein the brush forms an oblique angle to a common engagement surface.
Figure 9:
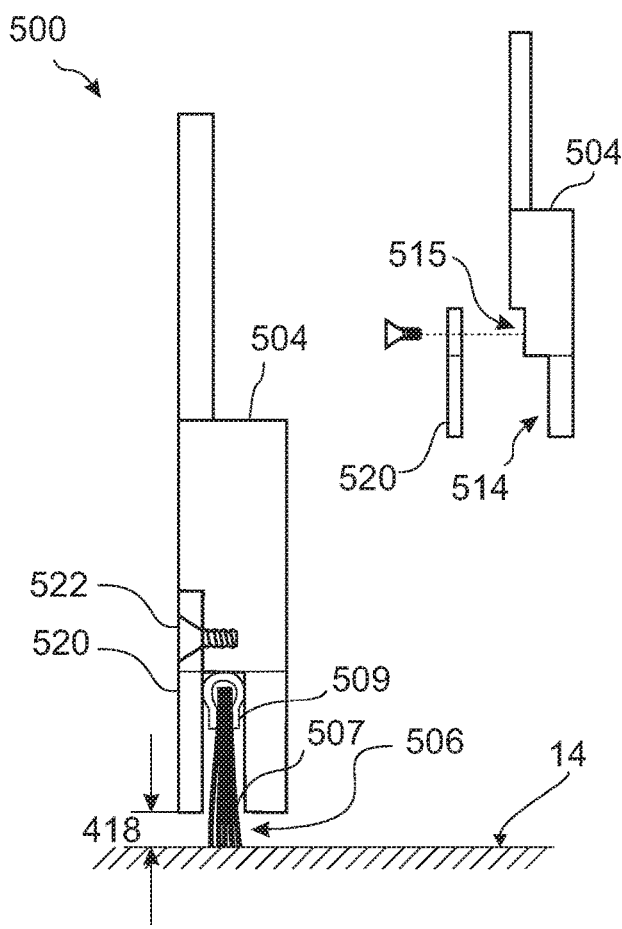
FIG. 9 illustrates a cross section of a sealing system, wherein the brush is perpendicular to a common engagement surface.

FIG. 8C illustrates the sealing system 400 viewed in the traveling direction TD. In addition to what have been discussed above, FIG. 8C illustrates how the brush 406 is carried by the drop bar structure 404 in more detail by means of a dedicated brush holder 416. The brush holder 416 has an upper extension arranged to be sandwiched between the drop bar structure 404 and the fastening plate 420. The lower end of the brush holder 416 is shaped so as to partially encompass the brush 406 to keep the brush 406 in a firm grip. In the example embodiment, the brush element 409 is shaped so as to be held in a firm position by the brush holder 416. The brush holder 416 is fastened in relation to the drop bar structure 404 such that the brush 406 protrudes out from a bottom end of the drop bar structure 404 towards the common engagement surface 14 such as the brush 406 is in engagement with the common engagement surface 14. This defines a clearance 418 between the drop bar structure 404 and the common engagement surface 14. As can be seen in the Figures, the clearance 418 is covered by the brush 406 and the resilient nature of the brush 406 allows the drop bar 402 to keep a more efficient sealing than a drop bar having no brush.

The brush holder 416 is arranged such that the brush 406 forms an oblique angle α with the common engagement surface 14. The angle may preferably be within the range 20-40 degrees, but may alternatively be smaller, or larger.

FIG. 9 illustrates a sealing system 500 according to an alternative embodiment. The sealing system 500 has many features in common with the sealing system 400 illustrated in FIGS. 8A-8B, namely a drop bar 502 which includes a drop bar structure 504 and a brush 506. However, in this example embodiment, the drop bar structure 504 further comprises a recess 514 for receiving the brush 506. The fastening plate 520 is for this embodiment received into the drop bar structure 404 in a further recess 515. This way, the drop bar structure 504 and the fastening plate 520 will have upper surfaces being flush with each other. The brush 506, which includes brush element 509 and bristles 507, may be clamped towards the drop bar structure 504 using bolts or screws 522 as illustrated in FIG. 9. The brush 506 is arranged with respect to the drop bar structure 504 such that the bristles 507 of the brush 506 are directed perpendicular, or substantially perpendicular, to the common engagement surface 14.

As for FIG. 8C, FIG. 9 illustrates the clearance 418 between the drop bar structure 504 and the common engagement surface 14 such that the brush 506 is the only part of the sealing system 500 that is in engagement with the common support structure 14.

FIGS. 8C and 9 illustrate two different example embodiments of the brush-based sealing system according to the disclosure, wherein the brush 406, 506 is arranged in different ways. However, it should be understood that theses embodiments are only examples and the arrangement of the brush is not limited to these embodiments. Thus, for example, the brush may be angled in any direction, towards or away from the drop bar structure but also along the drop bar structure. Alternative embodiments may include a drop bar including two or more brushes arranged parallel to each other. For example, in one embodiment the drop bar includes two brushes arranged on opposite sides of the drop bar, wherein each brush forms a respective oblique angle with the common engagement surface.

FIGS. 10-14 illustrate different embodiments of the sealing system arranged in parallel with a further sealing system so as to define a sealing assembly of the machine.

The further sealing system may be any of the sealing system discussed in relation to FIGS. 2-9, or alternatively another sealing system not disclosed therein. The further sealing system is connected to the support structure 16 of the furnace 10 and arranged along the traveling direction TD.

A purpose of the further sealing system is to seal the gap 18 between the support structure 16 and the common engagement surface 14, so as to prevent gas, droplets and/or particulate matter from passing through the gap 18. The further sealing system is arranged at a spaced distance from the sealing system such that an elongate cavity is formed.

Figure 10A:
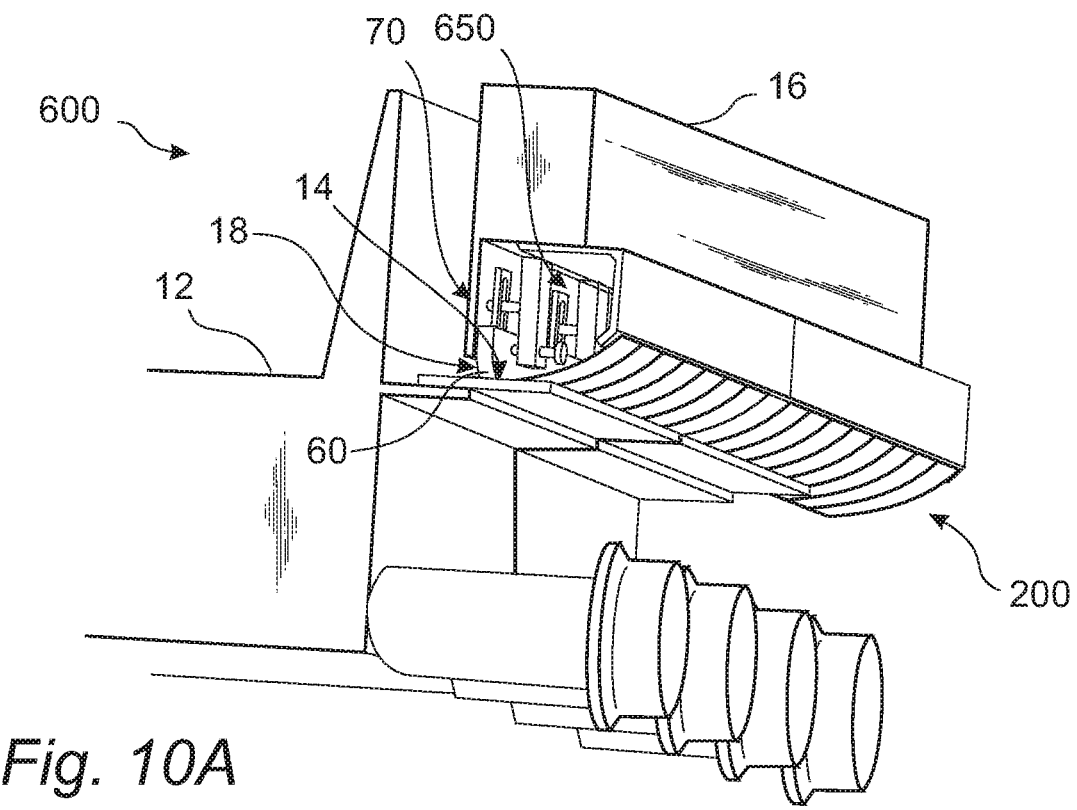
FIGS. 10A-10B illustrate an embodiment of a sealing assembly comprising the sealing system with a series of leaf members, and a further sealing system comprising a drop bar.
Figure 10B:
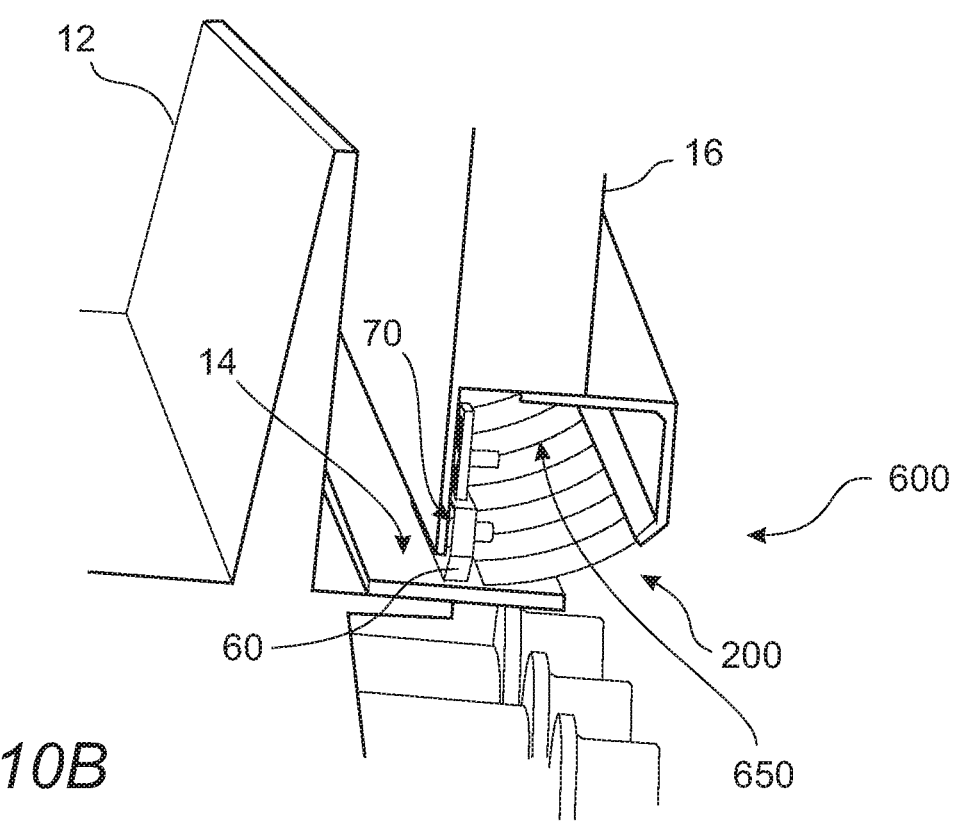

FIGS. 10A-10B illustrate an embodiment of a sealing assembly 600 comprising the sealing system 200 in parallel with a sealing system 70 as arranged when connected to the support structure 16 of the machine 100. The sealing system 70 comprises a drop bar 60 of conventional type well known in the art. The sealing system 70 is slidably connected to the support structure in a manner similar to what has been described herein. The sealing system 70 is arranged at a spaced distance from the sealing system 200, at an interior side of the furnace 10, such that an elongate cavity 650 is formed between the two sealing systems 70, 200. For a person skilled in the art, it is conceivable that the sealing system, although illustrated here as a sealing system 200, may alternatively be a sealing system 300 according to the embodiment disclosed in FIGS. 6A-6B.

Figure 11A:
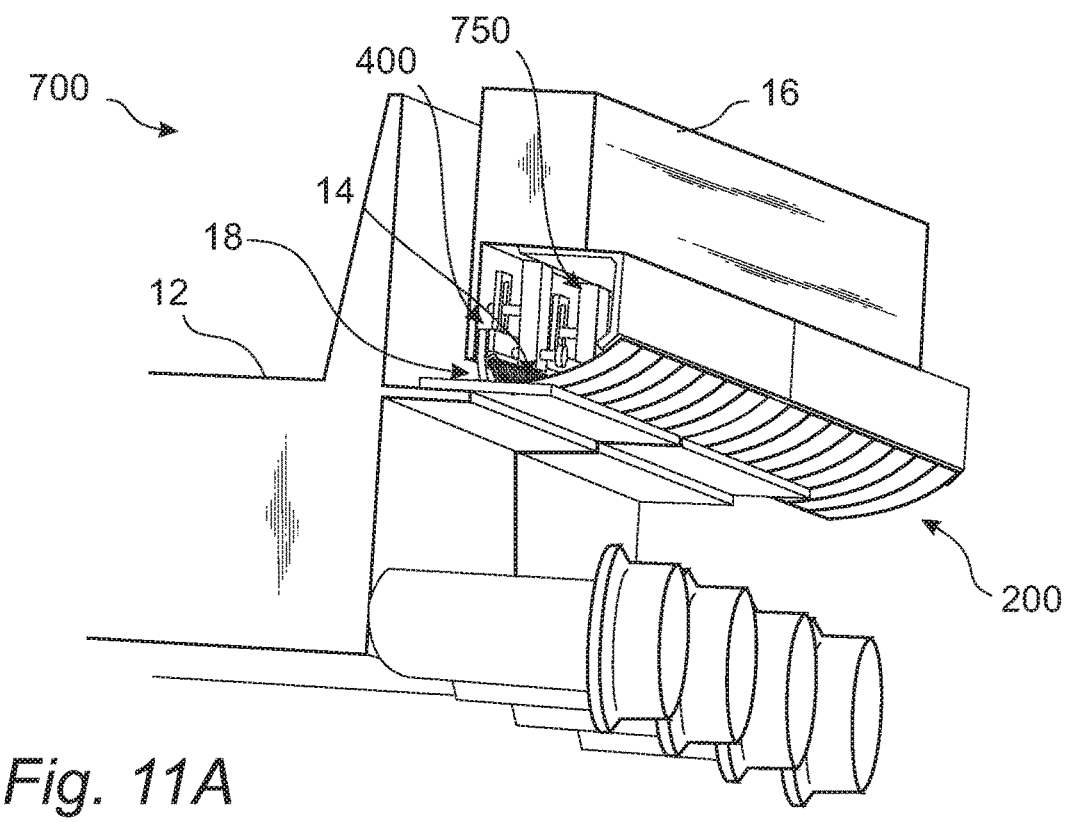
FIGS. 11A-11B illustrate an embodiment of a sealing assembly comprising the sealing system with a series of leaf members, and a further sealing system comprising a drop bar with a brush.
Figure 11B:
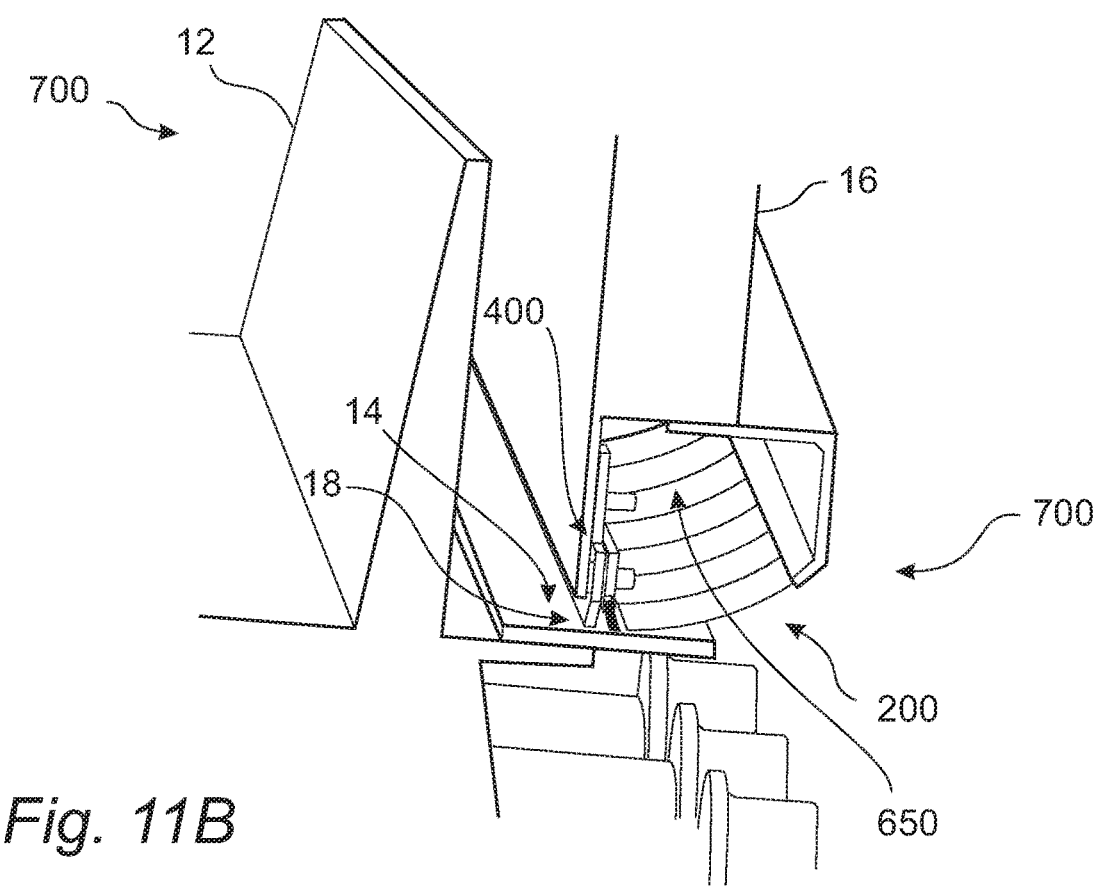

FIGS. 11A-11B illustrate an embodiment of a sealing assembly 700 comprising the sealing system 200 in parallel with the sealing system 400 previously disclosed herein. As for sealing assembly 600, the two sealing systems 200, 400 are arranged in parallel to each other along the traveling direction TD. The sealing system 400 comprises a drop bar 402 including a drop bar structure 404 and a brush 406, as previously disclosed in detail with reference to FIGS. 7-8. The sealing system 400 is slidably connected to the support structure 16 via each of the drop bar structures 404. The sealing system 400 is arranged at a spaced distance from the sealing system 200, at an interior side of the furnace 10, such that an elongate cavity 750 is formed between the two sealing systems 200, 400. For a person skilled in the art, it is conceivable that the sealing system illustrated here as a sealing system 200, may alternatively be a sealing system 300 according to the embodiment disclosed in FIGS. 6A-6B. Similarly, for a person skilled in the art, it is conceivable that the sealing system illustrated here as a sealing system 400, may alternatively be a sealing system 500 according to the embodiment disclosed in FIG. 9.

Figure 12:
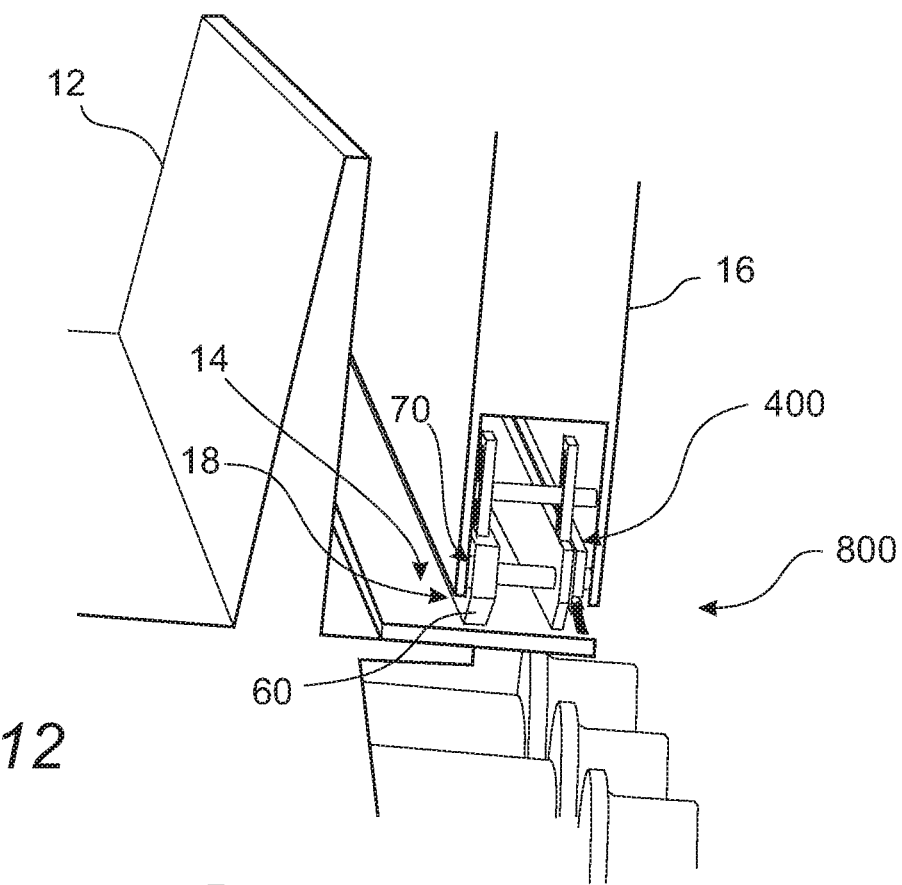
FIG. 12 illustrates an embodiment of a sealing assembly comprising a sealing system comprising a drop bar including a drop bar structure and a brush, and a further sealing system comprising a drop bar.

FIG. 12 illustrates an embodiment of a sealing assembly 800 of the sealing system 400 in parallel with sealing system 70 as arranged when connected to the support structure 16 of the machine 100.

The sealing system 400 comprises a drop bar 402 including a drop bar structure 404 and a brush 406, according to the embodiment of a sealing system disclosed in FIGS. 7 and 8A-8C. The sealing system 70 comprises a drop bar 60 of conventional type known in the art. Thus, the main difference between the sealing system 70 and the sealing system 400 is that the sealing system 70 lacks a brush.

The sealing system 70 is arranged at a spaced distance from the sealing system 400, at an interior side of the furnace 10, such that an elongate cavity 850 is formed between the two sealing systems 70, 400. For a person skilled in the art, it is conceivable that the sealing system 400 and the sealing system 70 may be arranged in an opposite way, such that the sealing system 400 is arranged facing the pallet cars 12 and the sealing system 70 is arranged on the opposite side facing the interior of the furnace 10. The sealing system 400 is connected to a first side of the support structure 16 and the sealing system 70 is connected to a second side of the support structure 16, opposite the first side, such that the sealing system 400 and the sealing system 70 are facing each other. For a person skilled in the art, it is conceivable that the sealing system, although illustrated here as a sealing system 400, may alternatively be a sealing system 500 according to the embodiment disclosed in FIG. 9.

Figure 13:
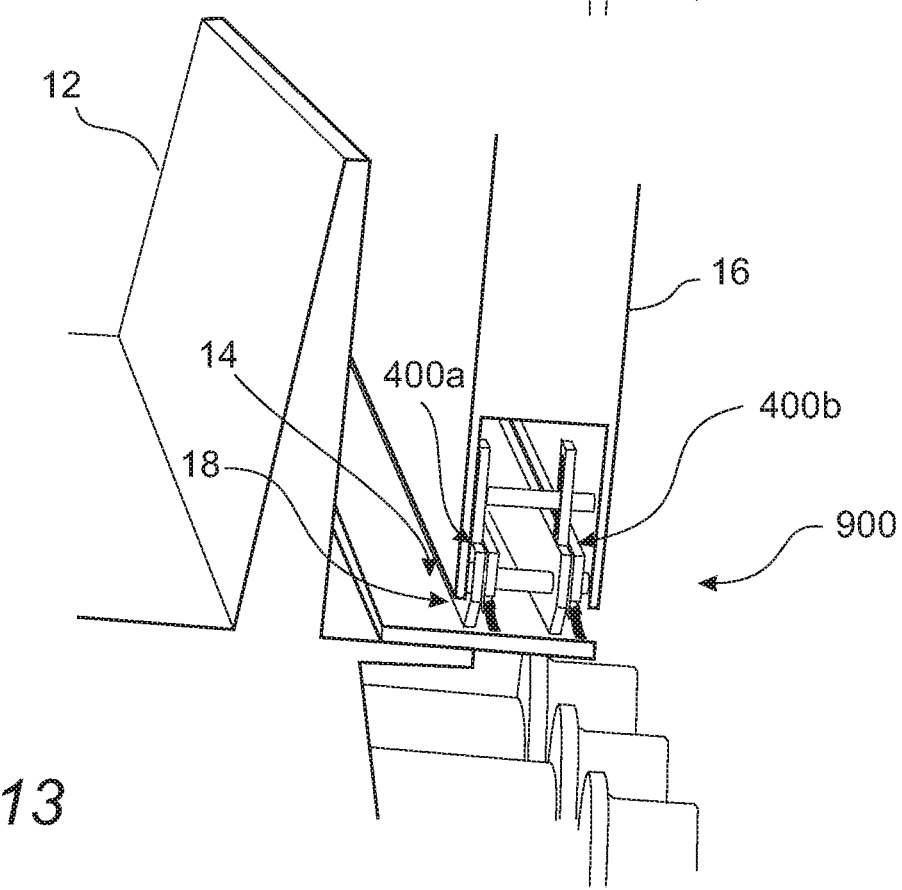
FIG. 13 illustrates an embodiment of a sealing assembly comprising a sealing system and a further sealing system, both comprising a drop bar including a drop bar structure and a brush.

FIG. 13 illustrates an embodiment of a sealing assembly 900 of the sealing system 400a in parallel with another sealing system 400b as arranged when connected to the support structure 16 of the machine 100. In the example embodiment, the sealing system 400a and the sealing system 400b are similar to the sealing system 400 which comprises drop bar 402 including a drop bar structure 404 and a brush 406, according to the embodiment of a sealing system disclosed in FIGS. 7-8. The sealing system 400a is connected to a first side of the support structure 16 and the sealing system 400b is connected to a second side of the support structure 16, opposite the first side, such that the sealing system 400a and the sealing system 400b are facing each other. For a person skilled in the art, it is conceivable that any one of the sealing systems, although illustrated here as sealing system 400, may alternatively be a sealing system 500 according to the embodiment disclosed in FIG. 9.

Figure 14:
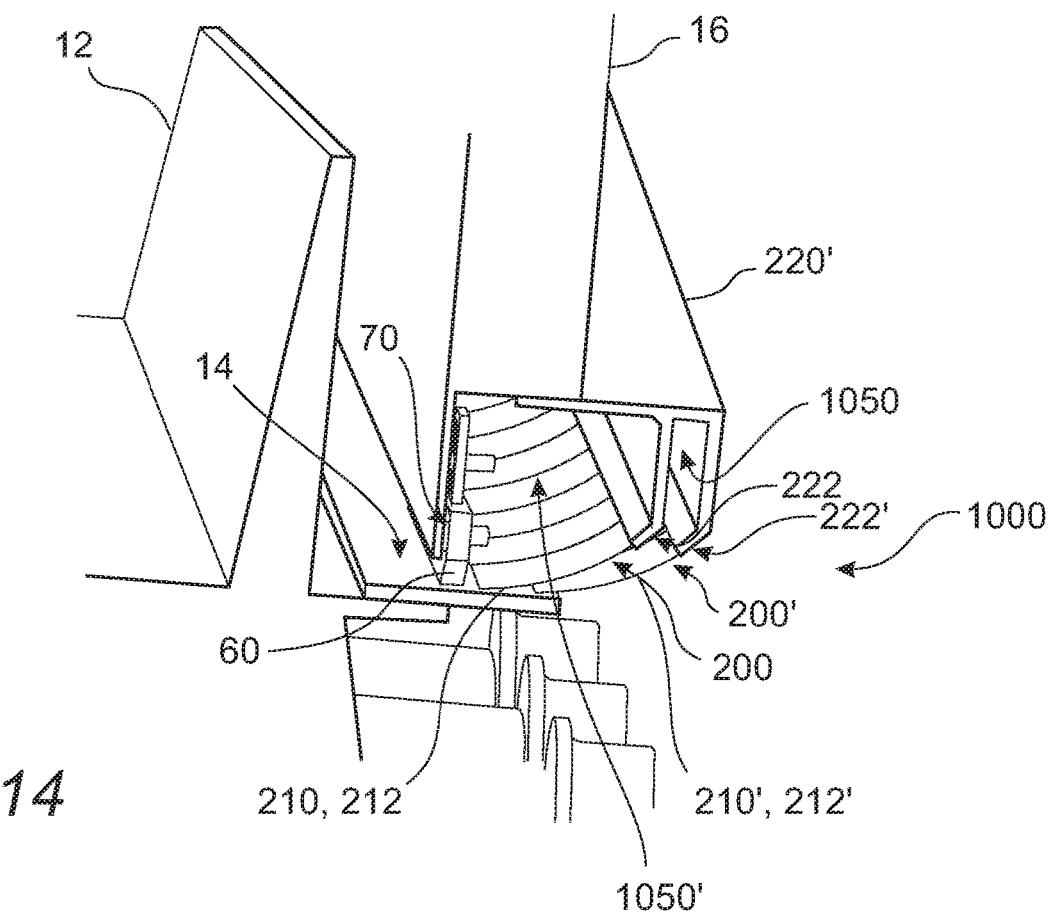
FIG. 14 illustrates an embodiment of a sealing assembly comprising a sealing system and a further sealing system, both comprising a respective series of leaf members, together with yet a further sealing system comprising a drop bar.

FIG. 14 illustrates an embodiment of a sealing assembly 1000 of the sealing system 200 in parallel with another sealing system 200' as arranged when connected to the support structure 16 of the machine 100. In the example embodiment, sealing systems 200 and 200' are of similar type. Specifically, both sealing system 200 and sealing system 200' comprises a respective series 210, 210' of leaf members 212, 212' which are each partially overlapping so as to form a respective sealing surface. Bracket 220' differs from bracket 220 in that it provides a respective attachment surface 222, 222' for each of the series 210, 210' of leaf members 212, 212'. A cavity 1050 is formed between the two sealing systems 200, 200'. As can be seen in FIG. 14, the sealing system 100 further comprises sealing system 70 based on a conventional drop bar 60. Consequently, for sealing system 1000, a further cavity 1050' is formed between sealing system 70 and sealing system 200. Sealing system 200 and sealing system 200' may share common features, such as the shape and structure of the leaf members 212, 212'. However, it is also conceivable that sealing system 200 and sealing system 200' are different from each other in one or more ways.

By the embodiments disclosed in FIGS. 10-14, the sealing may be even further improved. This is advantageous in the firing and cooling zones of the machine 100, and particularly in the transition therebetween referred to as the after firing zone, as the risk of leakage may otherwise be high. Leakage from this zone may cause hazards as combustible gases from the furnace 10 may mix with oxidants from ambient air, thereby creating a risk of unwanted ignition. Therefore, it is of particular interest to minimize leakage in these zones.

Further, by the present arrangement, the innermost sealing system may protect the outermost sealing system from excessive thermal load.

Moreover, the elongate cavity 650, 750, 850, 950, 1050 and 1050' between the sealing systems may be provided with a gas flow so as to decrease the high temperature. By such an arrangement, the sealing systems may be cooled by the gas, enabling the use of even higher temperatures in the furnace than would otherwise be possible in order not to thermally damage the sealing systems.

The person skilled in the art realizes that the present invention by no means is limited to the preferred embodiments described above. On the contrary, many modifications and variations are possible within the scope of the appended claims. Additionally, variations to the disclosed embodiments can be understood and effected by the skilled person in practicing the claimed invention, from a study of the drawings, the disclosure, and the appended claims.

The invention claimed is:

1. A machine for thermal treatment of bulk material, comprising:
   a stationary furnace which presents a support structure, and
   a plurality of pallet cars traveling through the furnace along a traveling direction, wherein a series of the plurality of pallet cars located within the stationary furnace together define, at lateral sides of the plurality of pallet cars, a common engagement surface which extends through the furnace along the traveling direction,
   wherein the support structure of the furnace and the common engagement surface of the series of pallet cars of the plurality of pallet cars define a gap therebetween, said gap having a gap length along the traveling direction, the machine further comprising:
a sealing system comprising:
one or more drop bars distributed after each other along the traveling direction;
wherein each drop bar of the one or more drop bars includes a brush arranged on the drop bar such that the brush is configured to be in engagement with the common engagement surface such that the one or more drop bars covers the gap over at least parts of the gap length.

2. The machine according to claim 1, wherein brush bristles of the brush are made of stainless steel.

3. The machine according to claim 1, wherein brush bristles of the brush has a length of at least 20 mm.

4. The machine according to claim 1, wherein each drop bar further comprises a drop bar structure slidably connected to the support structure of the furnace, wherein the brush is carried by the drop bar structure.

5. The machine according to claim 4, wherein the brush protrudes out from the drop bar structure such that a clearance is formed between the drop bar structure and the common engagement surface.

6. The machine according to claim 5, wherein the clearance between the drop bar structure and the engagement surface is at least 1 mm.

7. The machine according to claim 4, wherein the drop bar structure of each drop bar of the one or more drop bars comprises a recess configured to receive the brush therein.

8. The machine according to claim 4, wherein each drop bar of the one or more drop bars further comprises a fastening plate configured to connect the brush to the drop bar structure.

9. The machine according to claim 8, wherein each drop bar of the one or more drop bars further comprises a brush holder configured to hold the brush and wherein the fastening plate is configured to clamp the brush holder towards the drop bar structure.

10. The machine according to claim 1, wherein the brush is arranged on the drop bar such that brush bristles of the brush are directed substantially perpendicular to the common engagement surface.

11. The machine according to claim 1, wherein the brush is arranged on the drop bar such that brush bristles of the brush forms an oblique angle with the common engagement surface.

12. The machine according to claim 1 wherein brush bristles of the brush has a length of between 20 and 100 mm.

13. The machine according to claim 1 wherein brush bristles of the brush has a length of 50 mm.

14. The machine according to claim 5, wherein the clearance between the drop bar structure and the engagement surface is between 5 to 20 mm.

15. The machine according to claim 5, wherein the clearance between the drop bar structure and the engagement surface is 10 mm.

16. A machine for thermal treatment of bulk material, comprising:
a stationary furnace which presents a support structure, and
a plurality of pallet cars traveling through the furnace along a traveling direction, wherein a series of pallet cars of said plurality of pallet cars together define, at lateral sides thereof, a common engagement surface which extends through the furnace along the traveling direction,
wherein the support structure of the furnace and the common engagement surface of the series of pallet cars of the plurality of pallet cars define a gap therebetween, said gap having a gap length along the traveling direction, the machine further comprising:
a first sealing system comprising:
one or more drop bars distributed after each other along the traveling direction;
wherein each drop bar of the one or more drop bars includes a brush arranged on the drop bar such that the brush is configured to be in engagement with the common engagement surface such that the one or more drop bars covers the gap over at least parts of the gap length,
wherein the machine further comprises a second sealing system connected to the support structure of the furnace and arranged along the traveling direction, the second sealing system being arranged to be in engagement with the common engagement surface so as to cover the gap over at least parts of the gap length, and wherein the second sealing system is arranged at a spaced distance from the first sealing system such that an elongate cavity is formed therebetween.

17. The machine according to claim 16, wherein the second sealing system comprises:
a series of leaf members which are partially overlapping so as to form a sealing surface, wherein each leaf member of the series of leaf members is connected to the support structure at a first end thereof, and in engagement with the common engagement surface at a second, opposite, end thereof.

18. The machine according to claim 16, wherein the second sealing system comprises a further one or more drop bars distributed after each other along the traveling direction.

19. The machine according to claim 18, wherein each drop bar of the further one or more drop bars includes a brush arranged on the drop bar such that the brush is configured to be in engagement with the common engagement surface such that the further one or more drop bars covers the gap over at least parts of the gap length.

20. The machine according to claim 16, wherein the first sealing system and the second sealing system are arranged in parallel to each other so as to cover the gap along a common gap width which extends over at least a firing zone and a cooling zone of the furnace.

21. A sealing system for a machine for the thermal treatment of bulk material, wherein the machine comprises a stationary furnace having a support structure, and a plurality of pallet cars traveling through the furnace along a traveling direction, wherein a series of the plurality of pallet cars that are located within the stationary furnace together define, at lateral sides thereof, a common engagement surface which extends through the furnace along the traveling direction, wherein the support structure of the furnace and the common engagement surface of the series of pallet cars of the plurality of pallet cars define a gap therebetween, the sealing system comprising:
one or more drop bars being configured to be distributed after each other along the traveling direction;
wherein each drop bar of the one or more drop bars includes a brush arranged on the drop bar such that the brush is configured to be in engagement with the common engagement surface such that the one or more drop bars covers the gap over at least parts of the gap length.

* * * * *